United States Patent
Das et al.

(10) Patent No.: US 12,547,626 B1
(45) Date of Patent: Feb. 10, 2026

(54) DATABASE QUERY DISTRIBUTION

(71) Applicant: Amazon Technologies, Inc., Seattle, WA (US)

(72) Inventors: Sudipto Das, Redmond, WA (US); Dhruv Goel, Bellevue, WA (US); Kimi Shah, Seattle, WA (US); Jatin Singla, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 77 days.

(21) Appl. No.: 17/491,125

(22) Filed: Sep. 30, 2021

(51) Int. Cl.
  *G06F 16/2453* (2019.01)
  *G06F 9/50* (2006.01)

(52) U.S. Cl.
  CPC ...... *G06F 16/24545* (2019.01); *G06F 9/5061* (2013.01)

(58) Field of Classification Search
  CPC .............. G06F 16/24545; G06F 16/283
  See application file for complete search history.

(56) References Cited

U.S. PATENT DOCUMENTS

| | | | | |
|---|---|---|---|---|
| 7,984,043 B1* | 7/2011 | Waas | ............... | G06F 16/8358 707/718 |
| 8,769,644 B1* | 7/2014 | Eicken | ............... | H04L 63/08 709/225 |
| 8,898,295 B2 | 11/2014 | Agiwal et al. | | |
| 9,071,609 B2 | 6/2015 | Khandekar et al. | | |
| 9,208,032 B1* | 12/2015 | McAlister | ............... | G06Q 40/04 |
| 9,641,431 B1* | 5/2017 | Fellows | ............... | G06F 9/5083 |
| 9,946,752 B2 | 4/2018 | Lydick et al. | | |
| 10,148,771 B2* | 12/2018 | Yazir | ............... | G06F 9/5027 |
| 10,205,594 B1* | 2/2019 | Kaufman | ............... | H04L 9/0822 |
| 10,404,791 B2 | 9/2019 | Puri et al. | | |
| 10,917,351 B2 | 2/2021 | Pfister et al. | | |
| 11,507,465 B1* | 11/2022 | Husain Bohra | ......... | G06F 9/505 |
| 11,537,311 B1* | 12/2022 | Dhupelia | ............... | G06F 3/0619 |
| 2003/0158842 A1* | 8/2003 | Levy | ............... | G06F 16/24532 |
| 2006/0101184 A1* | 5/2006 | Hegarty | ............... | G06F 11/2007 710/307 |
| 2009/0276364 A1* | 11/2009 | Iaia | ............... | G06Q 40/12 705/26.1 |
| 2010/0153960 A1* | 6/2010 | Youn | ............... | G06Q 10/103 709/224 |

(Continued)

*Primary Examiner* — Vaishali Shah
(74) *Attorney, Agent, or Firm* — S. Scott Foster; Kowert, Hood, Munyon, Rankin & Goetzel, P.C.

(57) ABSTRACT

A query placement system to receive a query from a client of a managed database service and identify a pool of processing clusters, respectively capable of processing the query. The query placement system randomly selects a first subset of two or more processing clusters from the pool of processing clusters. The query placement system sends the query to a first selected processing cluster in the first subset, wherein the first selected processing cluster is selected based on utilization data for the pool of processing clusters. The query placement system receives a response indicating that the selected processing cluster does not accept the query for execution, the response includes an estimated utilization for the query executing at the first selected processing cluster. The query placement system sends the query to a second selected processing cluster of the second subset based on the utilization data and the estimated utilization for the query.

20 Claims, 9 Drawing Sheets

(56) References Cited

U.S. PATENT DOCUMENTS

| | | | |
|---|---|---|---|
| 2010/0323725 A1* | 12/2010 | Cai | H04W 4/12 |
| | | | 455/466 |
| 2012/0150895 A1* | 6/2012 | Barsness | G06F 16/245 |
| | | | 707/769 |
| 2012/0215764 A1* | 8/2012 | Barsness | G06F 16/951 |
| | | | 707/720 |
| 2013/0024442 A1* | 1/2013 | Santosuosso | G06F 16/245 |
| | | | 707/720 |
| 2014/0075024 A1* | 3/2014 | Koza | H04L 63/104 |
| | | | 709/225 |
| 2014/0331235 A1* | 11/2014 | Lee | G06F 9/5027 |
| | | | 718/104 |
| 2017/0031622 A1* | 2/2017 | Nagarajan | G06F 3/0607 |
| 2018/0039674 A1* | 2/2018 | Seyvet | G06F 16/24535 |
| 2018/0060389 A1* | 3/2018 | Hwang | G06F 16/24542 |
| 2018/0060393 A1* | 3/2018 | Kalathuru | G06F 16/282 |
| 2018/0060395 A1* | 3/2018 | Pathak | G06F 16/248 |
| 2018/0131777 A1* | 5/2018 | Yazir | H04L 67/51 |
| 2020/0050694 A1* | 2/2020 | Avalani | G06F 16/2455 |
| 2020/0218736 A1* | 7/2020 | Cruanes | H04L 41/5025 |
| 2020/0219028 A1* | 7/2020 | Papaemmanouil | |
| | | | G06Q 10/06375 |
| 2020/0233869 A1* | 7/2020 | Gawande | G06F 9/5088 |
| 2020/0409949 A1* | 12/2020 | Saxena | G06F 9/505 |

* cited by examiner

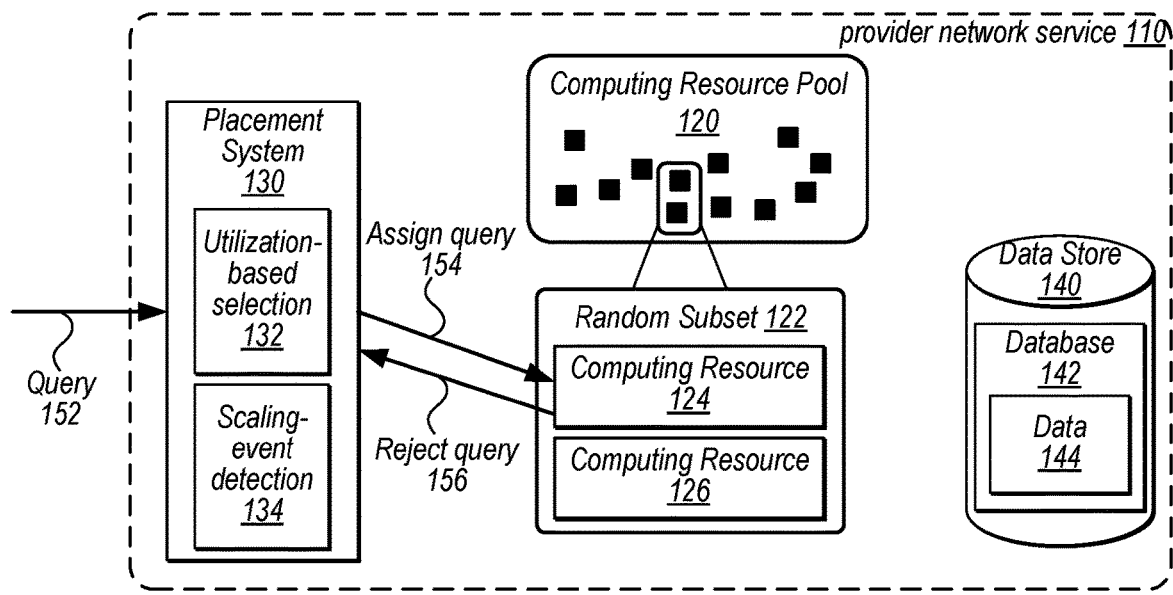
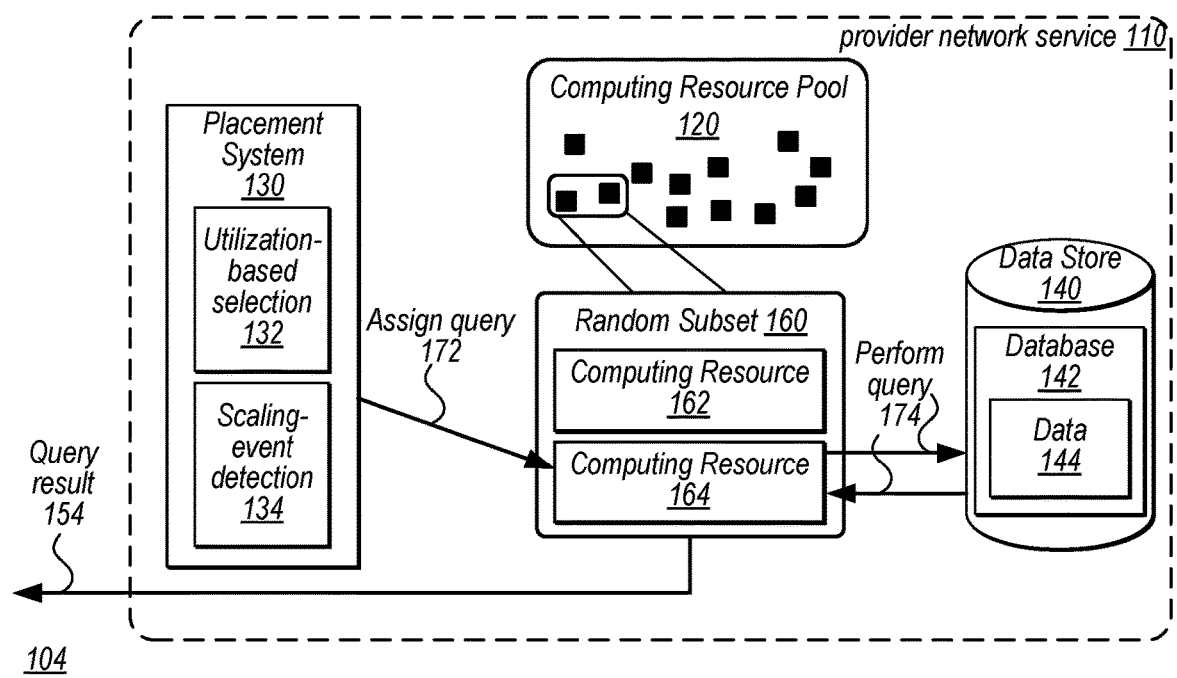
FIG. 1

*800*

```
┌─────────────────────────────────────────────────────────────────┐
│ Receive a query targeting a data set at a placement system for a provider │
│ network service that automatically manages a size of a pool of computing │
│         resources to perform queries to the data set 802         │
└─────────────────────────────────────────────────────────────────┘
                                    ↓
┌─────────────────────────────────────────────────────────────────┐
│ Receive a rejection of a first assignment of the query to a first computing │
│ resource of a first subset of computing resources randomly selected from the pool │
│ of computing resources, where the rejection includes an estimated utilization of │
│         the query executing at the first computing resource 804         │
└─────────────────────────────────────────────────────────────────┘
                                    ↓
┌─────────────────────────────────────────────────────────────────┐
│ Send a request to a second computing resource of a second subset of computing │
│ resources from the pool of computing resources to retry assignment of the query, │
│ where the second computing resource is selected based on the estimated │
│                  utilization of the query 806                   │
└─────────────────────────────────────────────────────────────────┘
                                    ↓
┌─────────────────────────────────────────────────────────────────┐
│ Based on a determination to modify the size of the pool of computing resources │
│  used to perform queries to the data set, send a request to a pool management │
│ service to provision additional resources for the pool of computing resources 808 │
└─────────────────────────────────────────────────────────────────┘
```

*FIG. 8*

DATABASE QUERY DISTRIBUTION

BACKGROUND

Database systems may receive queries from clients to retrieve data from data stores. The queries may be implemented by a pool of computing resources in a distributed computing system. The queries may be assigned to a given computing resource is at a threshold capacity until the next computing resource is assigned the next query. Loads are managed based on workload capacities of the computing resources. Workload capacities of computing resources may be provided to the query manager to determine whether a resource is at its capacity.

After each computing resource is at capacity, the pool of computing resources is scaled up to incorporate additional computing resources. Computing resources may attempt to keep the query manager up-to-date with the workload capacities, but the query manager would be delayed in maintaining current workload status because real-time updates from the computing resources may increase bandwidth consumption and computational overhead costs. The pool of computing resources may be prematurely scaled while the query manager is unaware that some computing resources have reduced workloads since the last update of the workload statuses.

BRIEF DESCRIPTION OF THE DRAWINGS

FIG. 1 is a block diagram of a provider network service to distribute database queries in a database system, according to some embodiments.

FIG. 8 is a flowchart diagram illustrating a method for query management for a data set, according to some embodiments.

Figure 2:
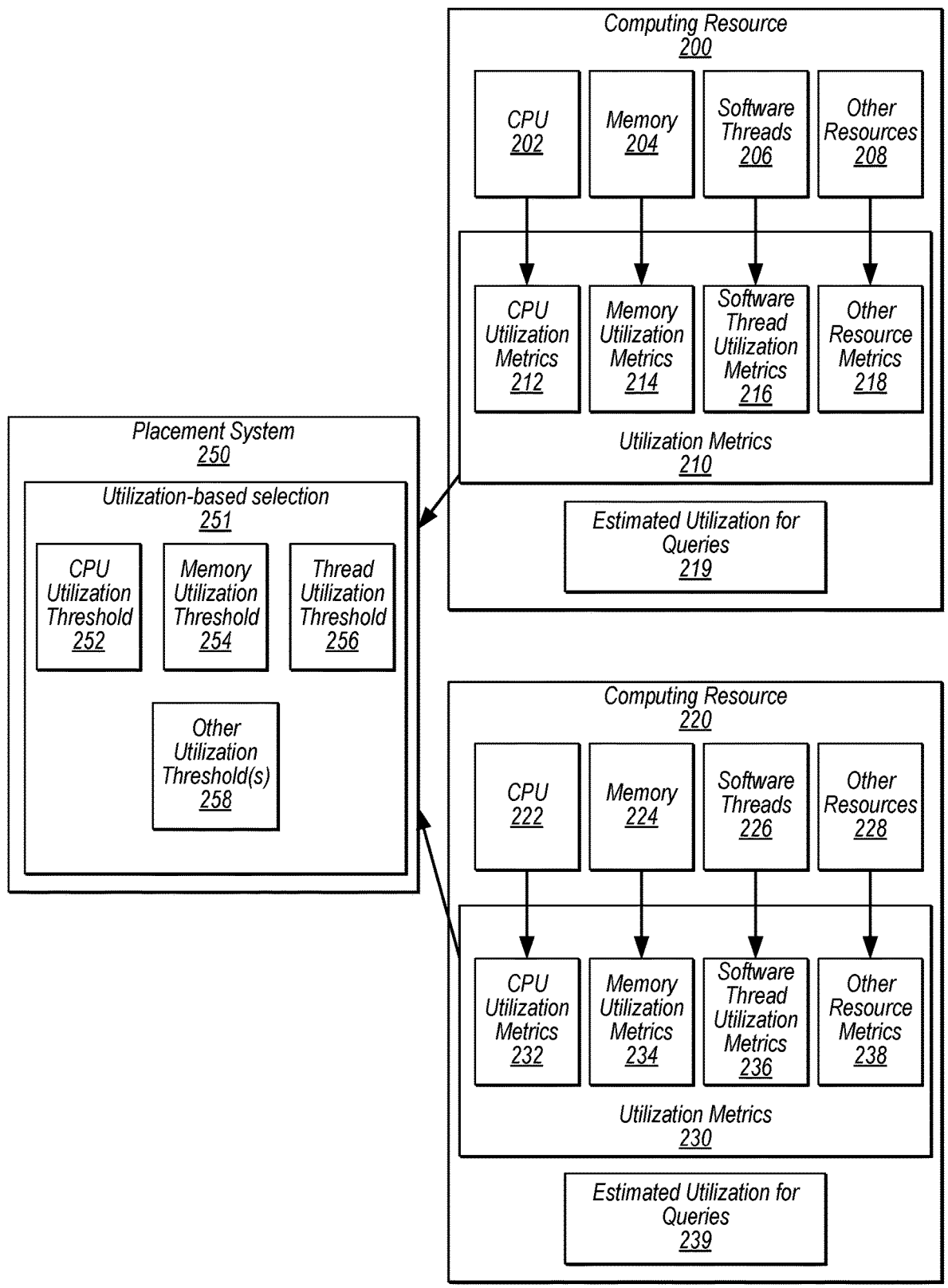
FIG. 2 is a block diagram of computing resources communicating utilization metrics to a query placement system, according to some embodiments.

While embodiments are described herein by way of example for several embodiments and illustrative drawings, those skilled in the art will recognize that the embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include", "including", and "includes" mean including, but not limited to.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

DETAILED DESCRIPTION

Various embodiments of systems and processes for distributing database queries across multiple query processing clusters are described herein. A database system may be implemented by a provider network that includes computing resources configured to provide various services to clients and end users (e.g., a multi-tenant cloud provider). The database system may be configured to receive database queries from clients. The database system may include a plurality of query processing clusters in a serverless configuration. One of the query processing clusters may be designated as a query engine to manage the other query processing clusters configured as query workers.

The query engine may include cluster selection logic configured to determine which query processing cluster of the plurality of query processing clusters should execute the query at the data store to retrieve data from a database. The query engine may include a load balancer configured to distribute the workload of incoming queries across the query processing clusters. Query processing clusters may include respective clusters of computing nodes configured to implement at least a portion of the query. For example, a query processing cluster may include a cluster of computing nodes configured to execute the query. Query processing clusters may include different quantities of computing nodes with respect to other query processing clusters in the database system. For example, one query processing cluster may include X computing nodes while another query processing cluster may include Y computing nodes.

The cluster selection logic may be configured to select the query processing cluster based on various decision factors. The cluster selection logic may select from a subset of the query processing clusters that is a limited selection of the query processing clusters. The subset may be determined from a variety of factors. For example, the subset may be determined from a random sampling from the query processing clusters, such as N random query processing clusters. Then, the cluster selection logic may select a query processing cluster from the N random query processing clusters based on worker selection criteria. As another example, the subset may be determined based on utilization metrics for the query processing clusters. The cluster selection logic may alternatively select a query processing cluster from all of the query processing clusters.

The worker selection criteria may include worker resource utilization, historical data for previous queries, or other points of data. For example, the worker resource utilization may include hardware utilization metrics, such as central processing unit ("CPU") utilization, random access memory ("RAM" or "memory") utilization, or software thread utilization. The historical data for previous queries may include data for previous queries being executed at the query processing cluster. In other implementations, the resource utilization may include other computing resources such as network traffic utilization, disk throughput, or input/output operations per second (IOPS). In yet other implementations, the worker selection criteria may include multiple policies that are based on a subset of the utilization metrics or all of the utilization metrics or other metrics that are relevant to query placements and admission control.

In some implementations, the cluster selection logic may select the query processing cluster from the subset of query processing clusters that has the lowest worker resource utilization when the cluster selection logic is analyzing the query processing clusters. For example, the cluster selection logic may analyze respective worker resource utilizations for the N random query processing clusters to select the lowest utilized query processing cluster.

The cluster selection logic may further determine whether the selected query processing cluster is capable in accepting the query for execution by the selected query processing cluster. The worker resource utilization for the selected query processing cluster may be analyzed to determine whether a utilization threshold is satisfied. For example, a CPU utilization of the selected query processing cluster may be compared against a CPU utilization threshold. In some implementations, the selected query processing cluster may be denied acceptance of the query based on the CPU utilization exceeding the CPU utilization threshold, such as to mitigate overcommitting the CPU of the selected query processing cluster. As another example, a memory utilization of the selected query processing cluster may be compared against a memory utilization threshold. In some implementations, the selected query processing cluster may be denied acceptance of the query based on the memory utilization exceeding the memory utilization threshold, such as to mitigate overcommitting the memory of the selected query processing cluster. In other embodiments, other policies may be configured to determine whether the selected query processing cluster is capable in accepting the query. The other policies may be based on network traffic utilization, disk utilization or IOPS, in various embodiments.

The cluster selection logic may analyze the worker resource utilization in combination with the historical data to determine whether the query processing cluster is capable or eligible to accept the query for execution at the query processing cluster. The cluster selection logic may estimate or calculate a projected resource utilization for the query based on the historical data for similar queries at the selected query engine. In some implementations, the query may be rejected for the selected query processing cluster based on the worker resource utilization added with the projected resource utilization compared with the utilization threshold. In some implementations, the selected query processing cluster may be denied acceptance of the query based on the CPU utilization added with a projected CPU utilization exceeding the CPU utilization threshold, such as to mitigate overcommitting the CPU of the selected query processing cluster. As another example, a memory utilization of the selected query processing cluster may be compared against a memory utilization threshold. In some implementations, the selected query processing cluster may be denied acceptance of the query based on the memory utilization added with a projected memory utilization exceeding the memory utilization threshold, such as to mitigate overcommitting the memory of the selected query processing cluster.

The rejection of the query may include an estimated utilization of the query being executed on the query processing cluster. In some embodiments, the query processing cluster may generate the estimated utilization for the query based on historical data for other queries performed by the query processing cluster. The query processing cluster may also be configured to predict the estimated utilization for the query based on data statistics for concurrency and other queries.

Based on a determination that the selected query processing cluster is unable to accept the query, another query processing cluster may be selected. In some implementations, another query processing cluster from the subset of query processing clusters may be selected based on analysis of respective worker resource utilization metrics for a remainder of the subset of query processing clusters. The process may be iterated multiple times until a suitable query processing cluster is found for the query. In another implementation, a random query processing cluster may be selected from the subset of query processing clusters without regard to the worker resource utilization. In yet another implementation, additional query processing clusters may be deployed, implemented, or allocated to perform the query. In some situations, the worker selection criteria may change between iterations of attempting to select the query processing cluster to perform the query.

In some implementations, a system may include at least one processor and a memory, storing program instructions that when executed by the at least one processor, cause the at least one processor to implement a query placement system for a managed database service. The query placement system may be configured to receive a query from a client of the managed database service. The query placement system may be configured to identify a pool of processing clusters associated with the client, respectively capable of processing the query. The query placement system may be configured to randomly select a first subset of two or more processing clusters from the pool of processing clusters. The query placement system may be configured to send the query to a first selected processing cluster in the first subset, wherein the first selected processing cluster is selected by the query placement service responsive to a determination that the selected processing cluster has a lowest utilization of the first subset according to utilization data for the pool of processing clusters maintained at the query placement system. The query placement system may be configured to receive a response from the first selected processing cluster of the first subset indicating that the first selected processing cluster does not accept the query for execution according to an evaluation of local utilization data maintained at the first selected processing cluster, wherein the response includes an estimated utilization for the query executing at the first selected processing cluster. The query placement system may be configured to send the query to a second selected processing cluster, wherein the second selected processing cluster of the second subset is selected by the query placement service according to the utilization data and the estimated utilization for the query before determining to modify a size of the pool of processing clusters.

In other implementations, a method may include receiving a query targeting a data set at a placement system for at a provider network service that automatically manages a size of a pool of computing resources used to perform queries to the data set. The method may also include after receiving a rejection of the query from a first computing resource of a first subset of computing resources selected from the pool of computing resources, wherein the rejection includes an estimated utilization for the query executing at the first computing resource: sending the query to a second computing resource of a second subset of computing resources from the pool of computing resources to retry assigning the query before determining to modify the size of the pool of computing resources used to perform queries to the data set, wherein the second computing resource is selected based on the estimated utilization of the query.

In yet other implementations, one or more computer-readable storage media store instructions that, when executed on or across one or more processors, cause the one or more processors to implement a placement system for a provider network service. The placement system may implement receiving a query targeting a data set at the placement system, wherein the provider network service automatically manages a size of pool of computing resources used to perform queries to the data set. The placement system may also implement sending the query to a first computing resource of a first subset of computing resources randomly selected from the pool of computing resources. The placement system may also implement in response to a rejection of the query from the first computing resource of the first subset of computing, wherein the rejection includes an estimated utilization for the query executing at the first computing resource: sending the query to a second computing resource of a second subset of computing resources from the pool of computing resources to retry assigning the query before determining to modify the size of the pool of computing resources used to perform queries to the data set, wherein the second computing resource is selected based on the estimated utilization of the query.

FIG. 1 is a block diagram of a provider network service 110 to distribute database queries in a database system, according to some embodiments. The provider network service 110 may include a computing resource pool 120, a placement system 130, and a data store 140, according to some embodiments. The provider network service 110 may include a database service, according to some embodiments. The provider network service 110 may receive a query 152 from a client, as depicted by implementation 102, according to some embodiments. The provider network service 110 may perform the query 152 to return a query result 154, as depicted by implementation 104, according to some embodiments.

The provider network service 110 may include a computing resource pool 120, according to some embodiments. The computing resource pool 120 may include multiple computing resources configured in a serverless configuration, the computing resources are capable of processing queries on behalf of the provider network service 110. In some embodiments, the computing resources may include processing clusters configured to process queries or other computing tasks on behalf of clients. For example, processing clusters of the computing resource pool 120 may be configured to perform the query 152 on behalf of the client. The query 152 may include obtaining or retrieving data from a database, such as data 144 of database 142 hosted at data store 140.

The provider network service 110 may implement placement system 130 to determine which computing resource of the computing resource pool 110 to execute the query 152, according to some embodiments. In some embodiments, the placement system 130 may determine a subset of computing resources from the computing resource pool 120 to reduce computational overhead for determining the computing resource to execute the query 152. For example, the placement system 130 may select a random subset 122 of the computing resource pool 120 to select a computing resource to execute the query 152. The random subset 122 may include two or more computing resources that are randomly selected from the computing resource pool 120. In some implementations, the placement system 130 may randomly select computing resource 124 and computing resource 126 as part of the random subset 122. As an illustrative, non-limiting example, the random subset 122 may include computing resource 124 and computing resource 126. In some situations, random selection of the random subset 122 may indiscriminately distribute workloads across the computing resource pool 120 to evenly distribute queries.

The placement system 130 may determine which computing resource of the random subset 122 according to resource selection criteria. The placement system 130 may be configured to determine the computing resource of the computing resource pool 120 to execute the query 152 based on criteria according to resource utilization of respective computing resources of the computing resource pool 120. For example, the placement system 130 may implement utilization-based selection 132 of for the query 152. In some embodiments, the utilization-based selection 132 may include determining respective resource utilization metrics for the random subset 122. For example, the utilization-based selection 132 may determine whether the computing resource 124 or the computing resource 126 has a lower resource utilization. The utilization-based selection 132 may select the computing resource with the lowest resource utilization to be assigned the query 152, according to some embodiments.

As an illustrative, non-limiting example, the computing resource 124 may be determined to have the lowest resource utilization of the random subset 122. As illustrated in FIG. 1, the placement system 130 may assign 154 the query 154 to the computing resource 124 in response to a determination that the computing resource 124 has the lowest resource utilization.

The computing resource 124 may determine whether the query 152 is acceptable by the computing resource 124 according to resource utilization thresholds, according to some embodiments. In some embodiments, the resource utilization thresholds may include a CPU utilization threshold, a memory utilization threshold, or a software thread utilization threshold. In some situations, the resource utilization thresholds may be based on physical limitations of hardware of the computing resources. In other situations, the resource utilization thresholds may be based on resource maintenance considerations. The computing resource 124 may also be configured to determine a predicted resource utilization for the query 152 executed by the computing resource 124 based on historical data for other queries performed by the computing resource 124, according to some embodiments. For example, the computing resource 124 may determine that, if the computing resource 124 were to execute the query 152, the computing resource 124 would have a predicted resource utilization while executing the query 152. In some embodiments, the computing resource 124 may be configured to measure utilization metrics indicating resource utilization of the computing resource 124, such as information indicating a CPU utilization, a memory utilization, or a software thread utilization for the computing resource 124.

In some implementations, the query 152 may be rejected 156 by the computing resource 124 based on the worker resource utilization added to the projected resource utilization compared with the utilization threshold. In some implementations, the computing resource 124 may reject 156 the query 152 based on the CPU utilization added with a projected CPU utilization exceeding the CPU utilization threshold, such as to mitigate overcommitting the CPU of the computing resource 124. As another example, a memory utilization of the computing resource 124 may be compared against a memory utilization threshold. In some implementations, the computing resource 124 may reject the query 154 based on the memory utilization added with a projected memory utilization exceeding the memory utilization threshold, such as to mitigate overcommitting the memory of the computing resource 124. As yet another example, a software thread utilization of the computing resource 124 may be compared against a software thread utilization threshold. In some implementations, the computing resource 124 may be reject the query 154 based on the software thread utilization added with a projected software thread utilization exceeding the software thread utilization threshold, such as to mitigate overcommitting the memory of the selected computing resource.

The placement system 130 may receive an indication that the random subset 122 does not include any computing resource that is capable in accepting the query 152 for execution, according to some embodiments. The computing resource 124 may be configured to reject 156 the query 152 based on a determination that the computing resource 124 does not satisfy one or more of the CPU utilization threshold, memory utilization threshold, or the software thread utilization threshold, according to some embodiments. In some embodiments, the placement system 130 may assign the query 152 to the computing resource 126 in response to the rejection 156. The computing resource 126 may be configured to determine whether the computing resource 126 satisfies the utilization threshold and a projected resource utilization for the query 152 executing at the computing resource 126.

The rejection 156 of the query 152 may include an estimated utilization of the query 152 being executed on the computing resource 124. In some embodiments, the computing resource 124 may generate the estimated utilization for the query 152 based on historical data for other queries performed by the computing resource 124. The computing resource 124 may also be configured to predict the estimated utilization for the query 152 based on data statistics for concurrency and other queries.

The placement system 130 may include scaling-event detection 134 configured to detect whether the computing resource pool 120 should be scaled to provision or incorporate additional computing resources, according to some embodiments. The placement system 130 may be configured to determine a modification to increase the size of the computing resource pool 120, according to some embodiments. In some situations, the placement system 130 may determine that the computing resource pool 120 has been exhausted of available computing resources after a threshold number of attempts to assign the query 152 have been performed. For example, the placement system 130 may detect that scaling the computing resource pool 120 is required after N number of attempts to assign the query 152 have failed. The placement system 130 may be configured to send a request to a pool management service configured to provision additional computing resources for the computing resource pool 120, according to some embodiments. In some situations, the pool management service may be unable to provision additional computing services such that the placement service 130 may have to force assignment or placement of the query with a random computing resource. For example, the forced assignment may cause the random computing resource to execute the query 152 subject to any resource limitations and cause the query 152 to be completed at the random computing resource. In another example, the query 152 may be executed by the random computing resource until failure of the execution. In some situations, the computing resource pool 120 may reach a maximum size. For example, the computing resource pool 120 may be unable to be scaled with additional computing resources. In some embodiments, the placement system 130 may force assignment of the query 152 based on a determination that the pool of computing resources 120 has reached the maximum size. In some embodiments, the placement system 130 may determine that the computing resource pool 120 should be scaled down based on the utilization data. For example, the placement system 130 may determine that the computing resource pool 120 is underutilized with respect to the utilization thresholds. As another example, the placement system 130 may determine that the computing resource pool 120 is underutilized when a threshold number of computing resources are idle or unused.

The placement system 130 may attempt to assign the query 152 to another computing resource of the random subset 122 in response to the rejection 156 of the query 152, according to some embodiments. For example, the placement system 130 may attempt to assign the query 152 to the computing resource 126 in response to the rejection 156 of the query 152. In other embodiments, the computing resources of the random subset 122 may be configured to identify another alternative computing resource within the random subset 122 for possible assignment of the query 152.

The placement system 130 may select another random subset 160 of computing resources from the computing resource pool 120 based on the rejection 156 of the query 152, according to some embodiments. For example, the placement system 130 may conclude that the random subset 122 is incapable in accepting the query 152 for execution, so the placement system 130 may select the other random subset 160 on a random basis to attempt to find another computing resource to assign the query 152. The random subset 160 may include two or more computing resources from the computing resource pool 120.

Implementation 104 depicts the provider network service 110 after rejection 156 of the query 152 by the random subset 122, according to some embodiments. The placement system 130 may be configured to attempt to assign 172 the query 152 to a computing resource of the random subset 160, according to some embodiments. For example, the placement system 130 may implement the utilization-based selection 132 of for the query 152. In some embodiments, the utilization-based selection 132 may include determining respective resource utilization metrics for the random subset 160. For example, the utilization-based selection 132 may determine whether the computing resource 162 or the computing resource 164 has a lower resource utilization. The utilization-based selection 132 may select the computing resource with the lowest resource utilization to be assigned the query 152, according to some embodiments.

As an illustrative, non-limiting example, the computing resource 164 may be determined to have the lowest resource utilization of the random subset 160. As illustrated in FIG. 1, the placement system 130 may assign 172 the query 154 to the computing resource 164 in response to a determination that the computing resource 164 has the lowest resource utilization.

The computing resource 164 may determine whether the query 152 is acceptable by the computing resource 164 according to resource utilization thresholds, according to some embodiments. In some embodiments, the resource utilization thresholds may include a CPU utilization threshold, a memory utilization threshold, or a software thread utilization threshold. The computing resource 164 may also be configured to determine a predicted resource utilization for the query 152 executed by the computing resource 164 based on historical data for other queries performed by the computing resource 164, according to some embodiments. For example, the computing resource 164 may determine that, if the computing resource 164 were to execute the query 152, the computing resource 164 would have a predicted resource utilization while executing the query 152. In some embodiments, the computing resource 164 may be configured to measure utilization metrics indicating resource utilization of the computing resource 124, such as information indicating a CPU utilization, a memory utilization, or a software thread utilization for the computing resource 164. In some embodiments, the utilization metrics may indicate a quantity of computing nodes for the computing resource. For example, a first computing resource may include X number of computing nodes, and a second computing resource may include Y number of computing nodes, where X is different from Y.

In some implementations, the query 152 may be accepted by the computing resource 164 based on the worker resource utilization added to the projected resource utilization compared with the utilization threshold. In some implementations, the computing resource 164 may accept the query 152 based on satisfying the utilization threshold. For example, the computing resource 164 may accept the query 152 based on the worker resource utilization added to the projected resource utilization being less than the utilization threshold.

In some situations, the query 152 may require a certain quantity of computing nodes to perform the query. For example, the utilization threshold may indicate a required quantity of computing nodes for the computing resources such that the computing resources are required to have the required quantity of computing nodes to be assigned the query 152. If the computing resource has fewer than the required quantity of computing nodes, the computing resource may be configured to reject the query.

The computing resource 164 may be configured to perform 174 the query 152 in response to accepting assignment 172 of the query 152, according to some embodiments. For example, the computing resource 164 may be configured to execute or implement the query 152 to perform 174 the query 152 with respect to the data store 140. In some embodiments, the performance 174 of the query 152 may include retrieving data 144 from the database 142 hosted at the data store 140. The data store 140 may return the data 144 to the computing resource 164 as part of the performance 174 of the query 152. The computing resource 164 may return a query result 154, according to some embodiments. For example, the computing resource 164 may return the query result 154 to the client that sent the query 152. As another example, the computing resource 164 may provide the query result 154 to a storage destination, such as a data cache service, for subsequent retrieval by the client.

The placement system 130 may be configured to track a quantity of attempts to assign the query to a computing resource, according to some embodiments. The placement system 130 may have a limited quantity of attempts that are permitted to assign the query. In some embodiments, based on a determination that the placement system 130 does not have any remaining attempts to assign the query, the placement system 130 may force an assignment of the query to a random computing resource. For example, assignment of the query may be directed to a computing resource without regard to the utilization metrics for the computing resource. In some situations, the computing resource may be configured to manage local query scheduling in order to mitigate overloading or overcommitment of the computing resource.

FIG. 2 is a block diagram of computing resources communicating utilization metrics to a query placement system, according to some embodiments. The computing resources may be collectively part of a subset of computing resources from a computing resource pool. The computing resource pool may correspond to the computing resource pool 120 of FIG. 1, according to some embodiments. The subset of computing resources may correspond to the random subset 122 of computing resources or the random subset 160 of computing resources of FIG. 1, according to some embodiments. Placement system 250 may correspond to the placement system 130 of FIG. 1.

The placement system 250 may be configured to implement utilization-based selection 251 between the computing resource 200 and the computing resource 220, according to some embodiments. For example, the placement system 250 may receive utilization metrics 210 for the computing resource 200 and utilization metrics 230 for the computing resource 220. The placement system 250 may store information indicating resource utilization thresholds. For example, the resource utilization thresholds may include a CPU utilization threshold 252, a memory utilization threshold 254, a software thread utilization threshold 256, or other utilization thresholds 258. In some embodiments, the other utilization thresholds 258 may include The computing resource 200 may include various hardware and software components that perform various tasks to perform queries, according to some embodiments. For example, the computing resource 200 may include a central processing unit (CPU) 202, a memory 204, and software threads 206. The computing resource 200 may be configured to measure and record utilization metrics 210 that indicate resource utilization at the computing resource 200, according to some embodiments. For example, the computing resource 200 may include hardware and software components configured to measure respective resource utilization of the computing resource 200. In some embodiments, the utilization metrics 210 may include information indicating CPU utilization metrics 212 for the CPU 202, memory utilization metrics 214 for the memory 204, software thread utilization metrics 216 for the software threads 206, or other utilization metrics 218 for other resources 208. In some embodiments, the other resources 208 may include other hardware components, such as network adapters, storage devices, a quantity of nodes for the computing resource 200. In some implementations, the other utilization metrics 218 may include network traffic utilization, disk throughput, or input/output operations per second (IOPS). In some embodiments, the computing resource 200 may provide the utilization metrics 210 to the placement system 250 in response to a request from the placement system 250. In other embodiments, the computing resource 200 may provide the utilization metrics 210 to the placement system 250 on a repeated or periodic basis.

The computing resource 200 may be configured to generate an estimated utilization for queries 219, according to some embodiments. For example, the computing resource 200 may store historical data for previous queries executed at the computing resource 200. The historical data may be extrapolated to determine a projected utilization of the CPU 202, the memory 204, the software threads 206, or the other resources 208 for executing a given query. In some embodiments, the estimated utilization for a query 219 may be provided as part of a rejection of the query for failing a local examination of utilization metrics leading to a determination that the computing resource 200 is unable to accept the query.

The computing resource 220 may include various hardware and software components that perform various tasks to perform queries, according to some embodiments. For example, the computing resource 220 may include a central processing unit (CPU) 222, a memory 224, and software threads 226. The computing resource 220 may be configured to measure and record utilization metrics 230 that indicate resource utilization at the computing resource 220, according to some embodiments. For example, the computing resource 220 may include hardware and software components configured to measure respective resource utilization of the computing resource 220. In some embodiments, the utilization metrics 230 may include information indicating CPU utilization metrics 232 for the CPU 222, memory utilization metrics 234 for the memory 224, software thread utilization metrics 236 for the software threads 226, or other utilization metrics 238 for other resources 228. In some embodiments, the other resources 228 may include other hardware components, such as network adapters, storage devices, a quantity of nodes for the computing resource 220. In some implementations, the other utilization metrics 238 may include network traffic utilization, disk throughput, or input/output operations per second (IOPS). In some embodiments, the computing resource 220 may provide the utilization metrics 230 to the placement system 250 in response to a request from the placement system 250. In other embodiments, the computing resource 220 may provide the utilization metrics 230 to the placement system 250 on a repeated or periodic basis.

The computing resource 220 may be configured to generate an estimated utilization for queries 239, according to some embodiments. For example, the computing resource 220 may store historical data for previous queries executed at the computing resource 220. The historical data may be extrapolated to determine a projected utilization of the CPU 222, the memory 224, the software threads 226, or the other resources 228 for executing a given query. In some embodiments, the estimated utilization for a query 239 may be provided as part of a rejection of the query for failing a local examination of utilization metrics leading to a determination that the computing resource 220 is unable to accept the query.

The placement system 250 may implement the utilization-based selection 251 based on the utilization metrics 210 and the utilization metrics 230, according to some embodiments. For example, the utilization-based selection 251 may determine which computing resource of the computing resource 200 and the computing resource 220 has a lowest resource utilization based on the utilization metrics 210 and the utilization metrics 230. Based on comparing the utilization metrics 210 to the utilization metrics 230, the utilization-based selection 251 may identify the computing resource with the lowest resource utilization. In some embodiments, the utilization-based selection 251 may be configured to utilize estimated utilization of a rejected query, such as the estimated utilization for queries 219 or the estimated utilization for queries 239, as part of a selection process for computing resources to execute the query. For example, a rejected query may be assigned to another computing resource based on a determination that the other computing resource would not fail thresholds based on the estimated utilization.

Figure 3:
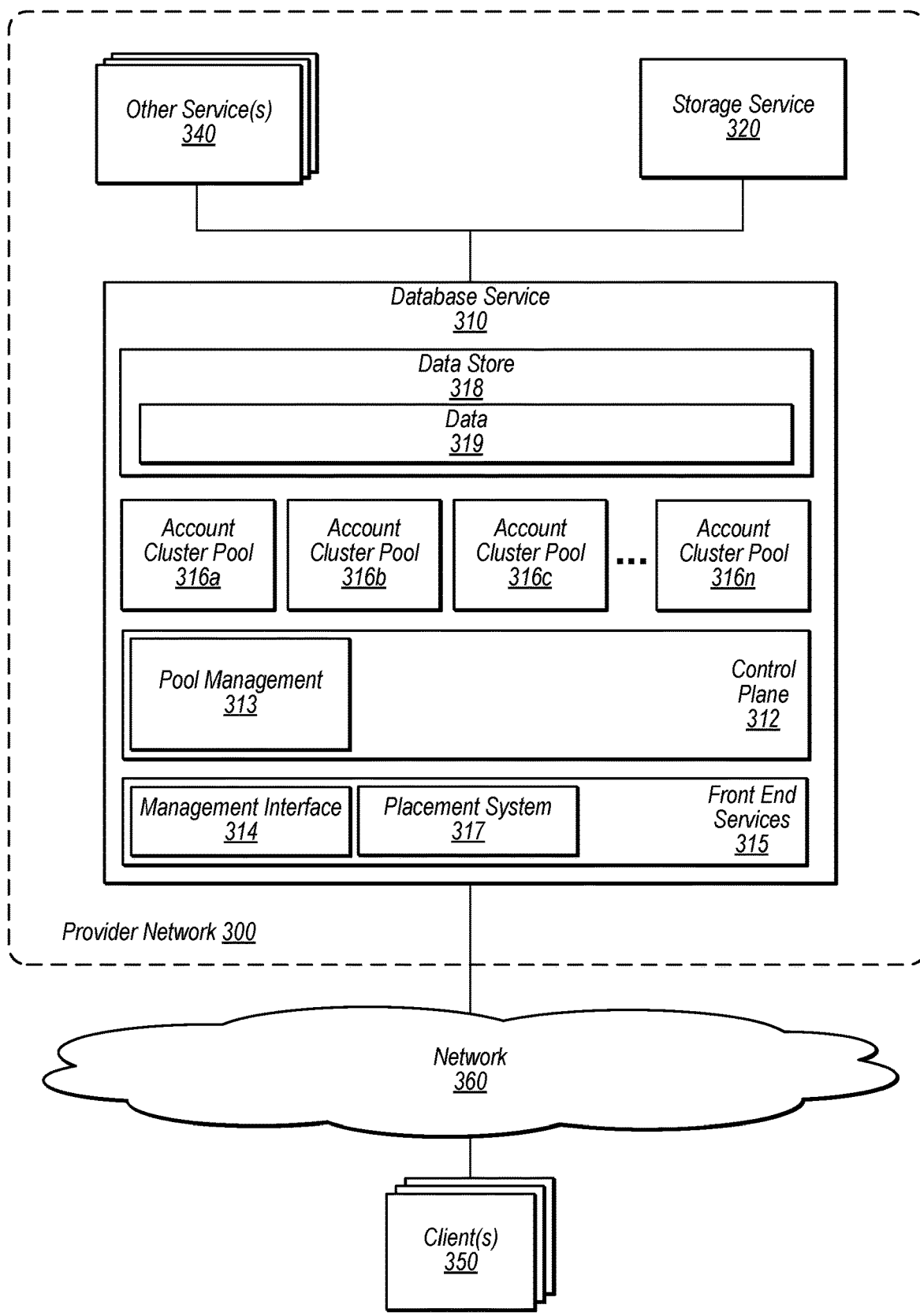
FIG. 3 is a block diagram of provider network 300 for a managed database as a service, according to some embodiments.

FIG. 3 is a block diagram of provider network 300 for a managed database as a service, according to some embodiments. The provider network 300 may be configured to provide various services to clients 350 via a network 360, according to some embodiments. The provider network 300 may include database service 310 configured to provide computing services. The provider network 300 may also include a storage service 320 and other services 340, according to some embodiments.

The provider network 300 can be formed as a number of regions, where a region is a separate geographical area in which the cloud provider clusters data centers. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the provider network 300 via a publicly accessible network (e.g., the Internet, a cellular communication network), such as the network 360. Regions are connected to a global network which includes private networking infrastructure (e.g., fiber connections controlled by the cloud provider) connecting each region to at least one other region. The provider network 300 may deliver content from points of presence outside of, but networked with, these regions by way of edge locations and regional edge cache servers. An edge location can be an extension of the cloud provider network outside of the traditional region/AZ context. For example, an edge location can be a data center positioned to provide capacity to a set of customers within a certain latency requirement, a set of servers provided to a customer's premises, or a set of servers provided within (or forming part of) a cellular communications network, each of which can be controlled at least in part by the control plane of a nearby AZ or region. This compartmentalization and geographic distribution of computing hardware enables the provider network 300 to provide low-latency resource access to customers on a global scale with a high degree of fault tolerance and stability.

The traffic and operations of the cloud provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the cloud provider network (e.g., computing instances, containers, block storage volumes, databases, file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

As noted above, provider network 300 may implement various computing resources or services, such as a database service 310, a block-based storage service 320, and other service(s) 340 which may be any other type of network-based services, including various other types of storage (e.g., an object storage service), data processing, analysis, communication, event handling, visualization, and security services not illustrated).

In various embodiments, the components illustrated in FIG. 3 may be implemented directly within computer hardware, as instructions directly or indirectly executable by computer hardware (e.g., a microprocessor or computer system), or using a combination of these techniques. For example, the components of FIG. 3 may be implemented by a system that includes a number of computing nodes (or simply, nodes), each of which may be similar to the computer system embodiment illustrated in FIG. 9 and described below. In various embodiments, the functionality of a given system or service component (e.g., a component of data storage service 320) may be implemented by a particular node or may be distributed across several nodes. In some embodiments, a given node may implement the functionality of more than one service system component (e.g., more than one data store component).

Database service 310 may offer database resources according to various configurations for client 350 operation. For example, database service 310 may include front end services 315 that include a management interface 314 and a placement system 317. Management interface 314 may implement the workflows, tasks, or other operations to manage databases, including, but not limited to establishing databases, disabling databases, or modifying databases. Placement system 317 may direct or assign queries to the database service 310 received from client 350 based on various factors, such as system load at account cluster pools 316*a* . . . *n*. Account cluster pools 316*a* . . . *n* may include respective cluster pools that are assigned or allocated to different accounts of the database service 310. For example, each of the accounts may correspond to a respective client of clients 550. In other embodiments, the account cluster pools 316*a* . . . *n* may be generally provisioned as cluster pools in a multi-tenant configuration. For example, each of the account cluster pools 316*a* . . . *n* may be directed to a first client for a first query and directed to a second client for a second query.

Database service 310 may implement control plane 312, which may include various features to manage the database service 310 on behalf of client(s) 350, in some embodiments. For example, control plane 312 may implement various interfaces that transmit information on behalf of the clients 350. Control plane 312 may also implement the pool management 313, which may support various operations to deploy, scale, modify, or terminate one or more of the account cluster pools 316*a* . . . *n* of the database service 310. Control plane 312 may also support various features related to implementing databases as a service.

Database service 310 may include data store 318 configured to store data 319. Data store 318 may include databases or include information that define databases to store data 319. Queries from clients 350 may request at least a portion of data 319 on behalf of clients 350. Account cluster pools 316*a* . . . *n* may be configured to retrieve data 319 in accordance with the queries from clients 350.

Interfaces may include various types of interfaces, such as a command line interface, graphical user interface, and/or programmatic interface (e.g., Application Programming Interfaces (APIs)) in order to perform requested operations. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another.

Provider network 300 may also implement block-based storage service 330, in various embodiments, for performing storage operations. Block-based storage service 330 may be a storage system that provides block level storage for storing one or more sets of data volumes of data that may be mapped to particular clients (e.g., data 319 of data store 318), providing virtual block-based storage (e.g., hard disk storage or other persistent storage) as a contiguous set of logical blocks. In some embodiments, block-based storage service 330 may store data in a data store.

Generally speaking, clients 350 may encompass any type of client configurable to submit network-based requests to provider network 300 via network 360, including requests for storage services (e.g., a request to create a replication job in migration service 330, etc.). For example, a given client 350 may include a suitable version of a web browser or may include a plug-in module or other type of code module that may execute as an extension to or within an execution environment provided by a web browser. Alternatively, a client 350 may encompass an application (or user interface thereof), a media application, an office application or any other application that may make use of resources in provider network 300 to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 350 may be an application may interact directly with provider network 300. In some embodiments, client 350 may generate network-based services requests according to a Representational State Transfer (REST)-style network-based services architecture, a document- or message-based network-based services architecture, or another suitable network-based services architecture.

In some embodiments, a client 350 may provide access to provider network 300 to other applications in a manner that is transparent to those applications. For example, client 350 may integrate with an operating system or file system to provide storage on a data storage service (e.g., a block-based storage service 330). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service may be coordinated by client 350 and the operating system or file system on behalf of applications executing within the operating system environment.

Clients 350 may convey network-based services requests to and receive responses from provider network 300 via network 360. In various embodiments, network 360 may encompass any suitable combination of networking hardware and protocols necessary to establish network-based-based communications between clients 350, user devices 352 and provider network 300. For example, network 360 may generally encompass the various telecommunications networks and service providers that collectively implement the Internet. Network 360 may also include private networks such as local area networks (LANs) or wide area networks (WANs) as well as public or private wireless networks. For example, both a given client 350 and provider network 360 may be respectively provisioned within enterprises having their own internal networks. In such an embodiment, network 360 may include the hardware (e.g., modems, routers, switches, load balancers, proxy servers, etc.) and software (e.g., protocol stacks, accounting software, firewall/security software, etc.) necessary to establish a networking link between given client 350 and the Internet as well as between the Internet and provider network 300. It is noted that in some embodiments, clients 350 may communicate with provider network 300 using a private network rather than the public Internet.

In some embodiments, provider network 300 may include the hardware (e.g., modems, routers, switches, load balancers, proxy servers, etc.) and software (e.g., protocol stacks, accounting software, firewall/security software, etc.) necessary to establish a networking links between different components of provider network 300, such as virtualization hosts, control plane components as well as external networks 360 (e.g., the Internet). In some embodiments, provider network 300 may employ an Internet Protocol (IP) tunneling technology to provide an overlay network via which encapsulated packets may be passed through the internal network using tunnels. The IP tunneling technology may provide a mapping and encapsulating system for creating an overlay network and may provide a separate namespace for the overlay layer and the internal network layer. Packets in the overlay layer may be checked against a mapping directory to determine what their tunnel target should be. The IP tunneling technology provides a virtual network topology; the interfaces that are presented to clients 350 may be attached to the overlay network so that when a client 350 provides an IP address that they want to send packets to, the IP address is run in virtual space by communicating with a mapping service that knows where the IP overlay addresses are.

Figure 4:
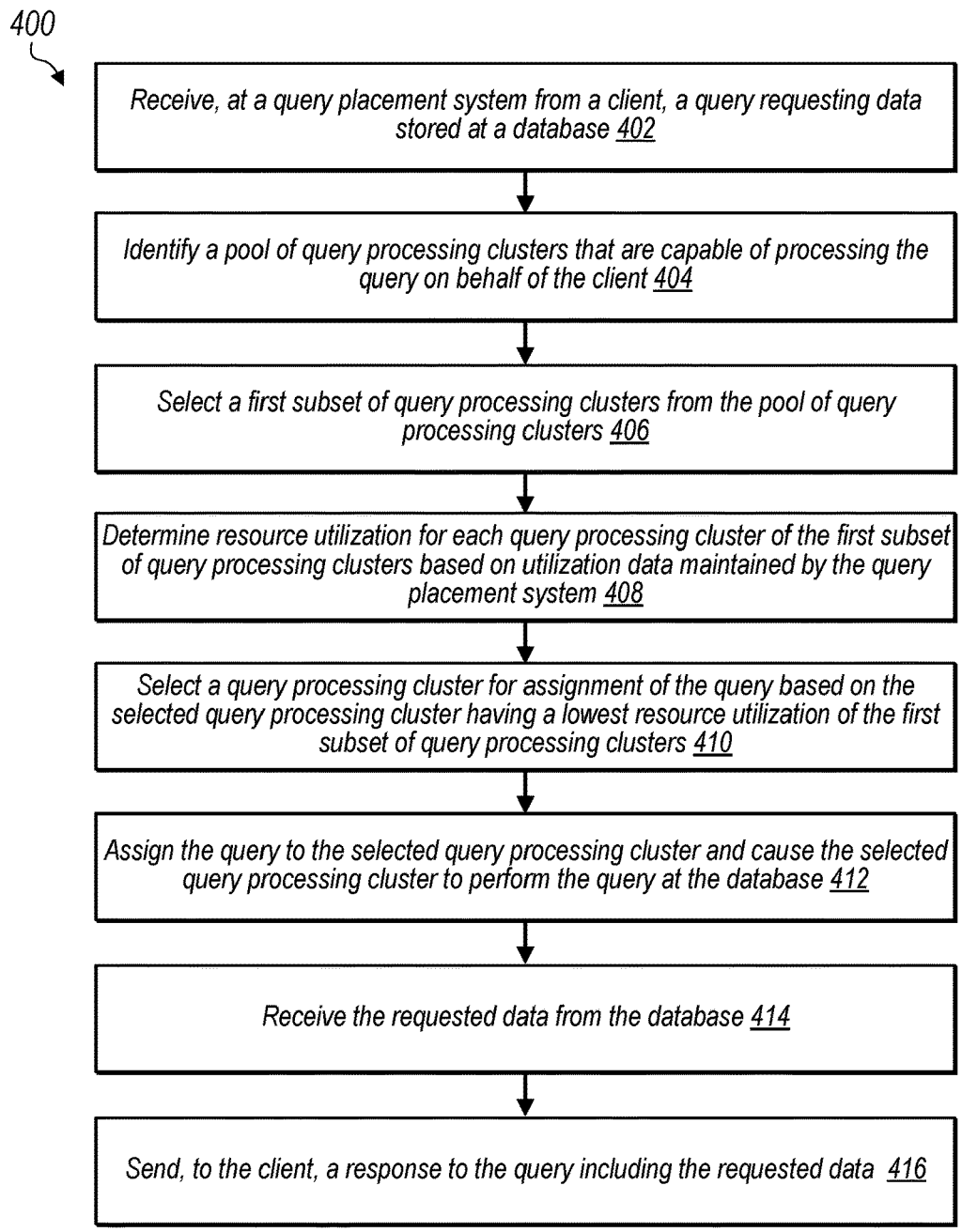
FIG. 4 is a flowchart diagram for a method for assigning a query to a computing resource for retrieving data from a database, according to some embodiments.

FIG. 4 illustrates a flowchart diagram for a method 400 for assigning a query to a computing resource for retrieving data from a database, according to some embodiments. The method 400 may be performed by a query placement system, such as the placement system 130 of FIG. 1, the placement system 250 of FIG. 2, or the placement system 317 of FIG. 3, according to some embodiments. The query placement system may be included as part of a database service, such as the provider network service 111 of FIG. 1 or database service 310 of FIG. 3, according to some embodiments. The database service may be implemented as part of a provider network, such as provider network 300 of FIG. 3, according to some embodiments.

The method 400 may include receiving, at a query placement system from a client, a query requesting data stored at a database, at 402. The client may correspond to the clients 350 of FIG. 3, according to some embodiments. The query may correspond to the query 152 of FIG. 1, according to some embodiments. The client may include a computing device configured to execute application logic for retrieving data from the database. The application logic may include generating the query and subsequently sending the query to the database service, according to some embodiments.

The method 400 may also include identifying a pool of query processing clusters that are capable of processing the query on behalf of the client, at 404. The pool of query processing clusters may correspond to the computing resource pool 120 of FIG. 1 or the account cluster pools 316a . . . n, according to some embodiments. In some embodiments, the pool of query processing clusters may be identified based on determining access permissions for the client. In other embodiments, the pool of query processing clusters may be identified based on allocations for the client as indicated in a service level agreement. In some embodiments, the query processing clusters may include a plurality of computing nodes configured to implement at least a portion of tasks to process the query on behalf of the client. For example, the computing nodes may be coordinated to collaboratively process the query.

The method 400 may further include selecting a first subset of query processing clusters from the pool of query processing clusters, at 406. The first subset of query processing clusters may correspond to the random subset 122 of FIG. 1. In some embodiments, the first subset of query processing clusters may be randomly selected. For example, the query placement system may select two or more query processing clusters at random from the pool of query processing clusters.

The method 400 may also include determining resource utilization for each query processing cluster of the first subset of query processing clusters based on utilization data maintained by the query placement system, at 408. In some embodiments, each query processing cluster of the first subset of query processing clusters may be configured to send the utilization data pertaining to respective query processing clusters. The utilization data may correspond to the utilization metrics 210 or the utilization metrics 230 of FIG. 2, according to some embodiments. The utilization data may include CPU utilization metrics, memory utilization metrics, or software thread utilization metrics, according to some embodiments. In some embodiments, the query placement system may store the utilization data for the query processing clusters as part of metadata for the query processing clusters.

The method 400 may further include selecting a query processing cluster for assignment of the query based on the selected query processing cluster having a lowest resource utilization of the first subset of query processing clusters, at 410. In some embodiments, the query placement system may compare the utilization data for each query processing cluster of the first subset of query processing clusters. For example, the query placement system may analyze the utilization data to determine which query processing clusters have a lowest CPU utilization, a lowest memory utilization, a lowest software thread utilization threshold, or a lowest combined resource utilization.

The method 400 may also include assigning the query to the selected query processing cluster and cause the selected query processing cluster to perform the query at the database, at 412. Assigning the query may correspond to assignment 154 or assignment 172 of the query of FIG. 1, according to some embodiments. The query placement system may be configured to send information pertaining to the query to the selected query processing cluster. The query placement system may send an instruction to the selected query processing cluster to initiate performance of the query to retrieve data from the database.

The method 400 may further include receiving the requested data from the database, at 414. In some embodiments, the query processing cluster may complete performance of the query at the database to obtain the requested data. In some embodiments, the query processing cluster may be configured to provide the requested data to a data processing system configured to transmit the requested data to the client.

The method 400 may conclude by sending, to the client, a response to the query including the requested data, at 416. The response to the query may correspond to the query result 154 of FIG. 1, according to some embodiments. The response to the query may provide the requested data to the client as a payload to the response. In some embodiments, the response to the query may include information indicating a storage location for the client to obtain the requested data from another storage location separate from the database.

Figure 5:
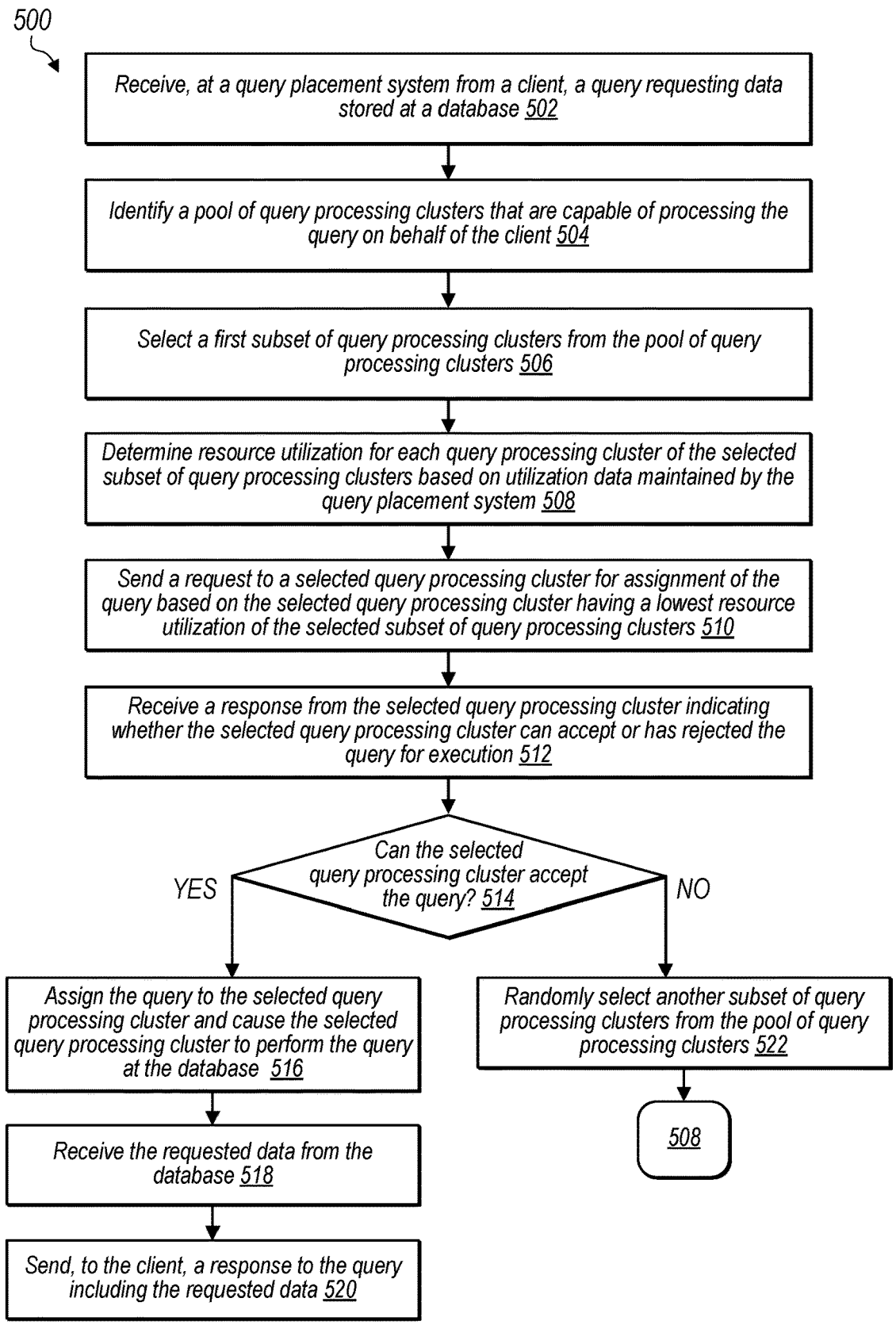
FIG. 5 is a flowchart diagram for a method for assigning a query to a computing resource for retrieving data from a database, according to some embodiments.

FIG. 5 illustrates a flowchart diagram for a method 500 for assigning a query to a computing resource for retrieving data from a database, according to some embodiments. The method 500 may be performed by a query placement system, such as the placement system 130 of FIG. 1, the placement system 250 of FIG. 2, or the placement system 317 of FIG. 3, according to some embodiments. The query placement system may be included as part of a database service, such as the provider network service 111 of FIG. 1 or database service 310 of FIG. 3, according to some embodiments. The database service may be implemented as part of a provider network, such as provider network 300 of FIG. 3, according to some embodiments.

The method 500 may include receiving, at a query placement system from a client, a query requesting data stored at a database, at 502. The client may correspond to the clients 350 of FIG. 3, according to some embodiments. The query may correspond to the query 152 of FIG. 1, according to some embodiments. The client may include a computing device configured to execute application logic for retrieving data from the database. The application logic may include generating the query and subsequently sending the query to the database service, according to some embodiments.

The method 500 may also include identifying a pool of query processing clusters that are capable of processing the query on behalf of the client, at 504. The pool of query processing clusters may correspond to the computing resource pool 120 of FIG. 1 or the account cluster pools 316a . . . n, according to some embodiments. In some embodiments, the pool of query processing clusters may be identified based on determining access permissions for the client. In other embodiments, the pool of query processing clusters may be identified based on allocations for the client as indicated in a service level agreement. In some embodiments, the query processing clusters may include a plurality of computing nodes configured to implement at least a portion of tasks to process the query on behalf of the client. For example, the computing nodes may be coordinated to collaboratively process the query.

The method 500 may further include selecting a first subset of query processing clusters from the pool of query processing clusters, at 506. The first subset of query processing clusters may correspond to the random subset 122 of FIG. 1. In some embodiments, the first subset of query processing clusters may be randomly selected. For example, the query placement system may select two or more query processing clusters at random from the pool of query processing clusters.

The method 500 may also include determining resource utilization for each query processing cluster of the first subset of query processing clusters based on utilization data maintained by the query placement system, at 508. In some embodiments, each query processing cluster of the first subset of query processing clusters may be configured to send the utilization data pertaining to respective query processing clusters. The utilization data may correspond to the utilization metrics 210 or the utilization metrics 230 of FIG. 2, according to some embodiments. The utilization data may include CPU utilization metrics, memory utilization metrics, or software thread utilization metrics, according to some embodiments. In some embodiments, the query placement system may store the utilization data for the query processing clusters as part of metadata for the query processing clusters.

The method 500 may further include sending a request to a selected query processing cluster for assignment of the query based on the selected query processing cluster having a lowest resource utilization of the first subset of query processing clusters, at 510. In some embodiments, the query placement system may compare the utilization data for each query processing cluster of the first subset of query processing clusters. For example, the query placement system may analyze the utilization data to determine which query processing clusters have a lowest CPU utilization, a lowest memory utilization, a lowest software thread utilization threshold, or a lowest combined resource utilization. In other embodiments, the query placement system may select the query processing cluster based on other selection criteria. For example, the other selection criteria may include other metrics such as cluster configurations, a quantity of nodes in the query processing cluster, known capabilities of the query processing cluster (e.g., hardware of the query processing cluster is optimized for a specific processing task), cluster bandwidth, or other cluster utilization metrics.

The method 500 may include receiving a response from the selected query processing cluster indicating whether the selected query processing cluster can accept or has rejected the query for execution, at 512. The method 500 may also include determining whether the selected query processing cluster can accept the query, at 514. In some embodiments, the response to the request may include a notification that indicates acceptance or rejection of the query. Based on a determination that the selected query processing cluster can accept the query, the method 500 may proceed to 516. Based on a determination that the selected query processing cluster has rejected the query for execution, the method 500 may proceed to 522.

Based on a determination that the selected query processing cluster can accept the query, the method 500 may also include assigning the query to the selected query processing cluster and cause the selected query processing cluster to perform the query at the database, at 516. Assigning the query may correspond to assignment 154 or assignment 172 of the query of FIG. 1, according to some embodiments. The query placement system may be configured to send information pertaining to the query to the selected query processing cluster. The query placement system may send an instruction to the selected query processing cluster to initiate performance of the query to retrieve data from the database.

The method 500 may further include receiving the requested data from the database, at 518. In some embodiments, the query processing cluster may complete performance of the query at the database to obtain the requested data. In some embodiments, the query processing cluster may be configured to provide the requested data to a data processing system configured to transmit the requested data to the client.

The method 500 may conclude by sending, to the client, a response to the query including the requested data, at 520. The response to the query may correspond to the query result 154 of FIG. 1, according to some embodiments. The response to the query may provide the requested data to the client as a payload to the response. In some embodiments, the response to the query may include information indicating a storage location for the client to obtain the requested data from another storage location separate from the database.

Based on a determination that the selected query processing cluster has rejected the query for execution, the method 500 may include randomly selecting another subset of query processing clusters from the pool of query processing clusters, at 522. In some embodiments, the query placement system may be configured to attempt to select a query processing cluster from another subset of query processing clusters. For example, the query placement system may identify two or more other query processing clusters from the pool of query processing clusters to attempt assignment of the query. The method 500 may return to 508 to determine resource utilization for each query processing cluster of the other selected subset of query processing clusters. The method 500 may continue until the query placement system is able to assign the query to a query processing cluster.

Figure 6:
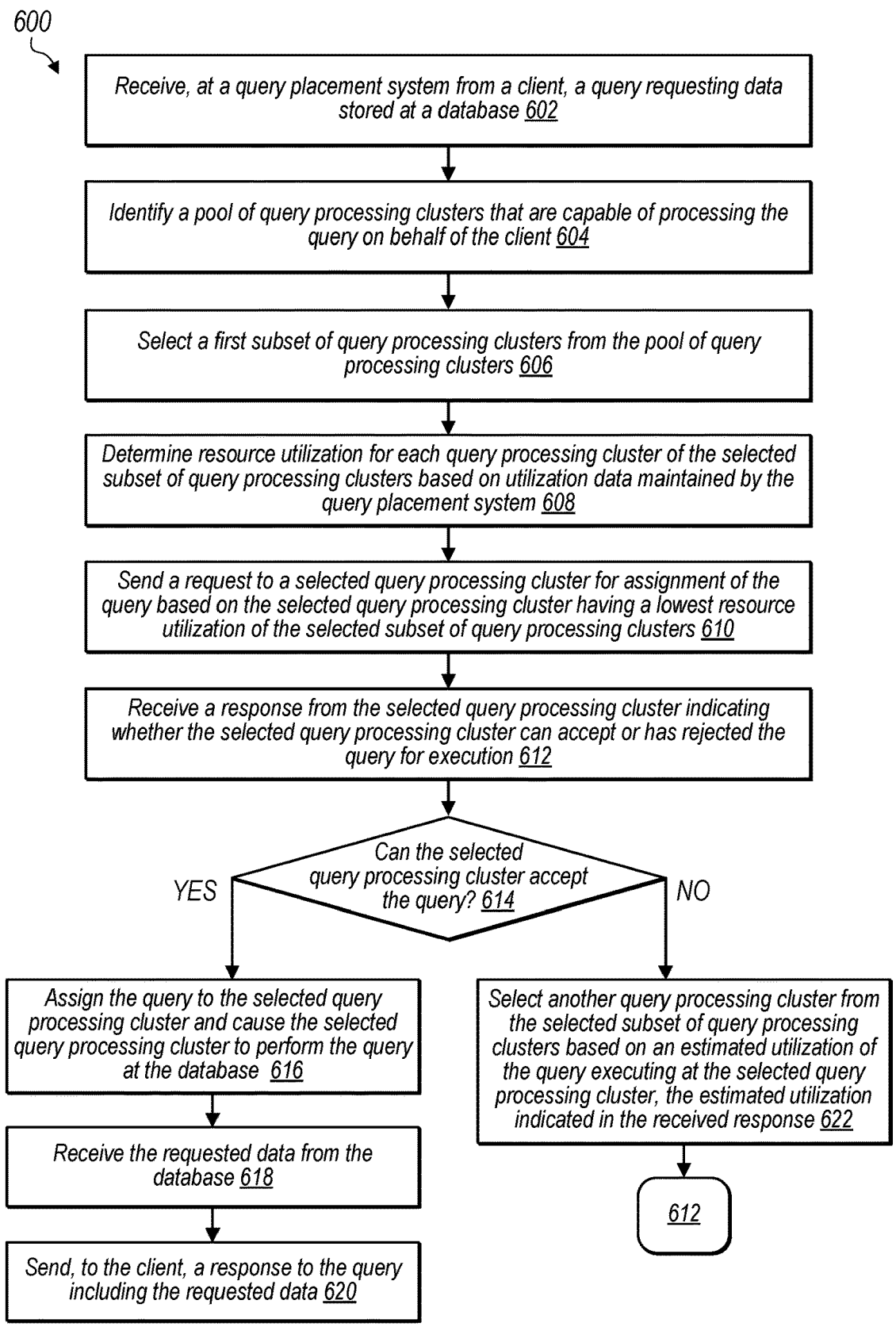
FIG. 6 is a flowchart diagram for a method for assigning a query to a computing resource for retrieving data from a database, according to some embodiments.

FIG. 6 illustrates a flowchart diagram for a method 600 for assigning a query to a computing resource for retrieving data from a database, according to some embodiments. The method 600 may be performed by a query placement system, such as the placement system 130 of FIG. 1, the placement system 250 of FIG. 2, or the placement system 317 of FIG. 3, according to some embodiments. The query placement system may be included as part of a database service, such as the provider network service 111 of FIG. 1 or database service 310 of FIG. 3, according to some embodiments. The database service may be implemented as part of a provider network, such as provider network 300 of FIG. 3, according to some embodiments.

The method 600 may include receiving, at a query placement system from a client, a query requesting data stored at a database, at 602. The client may correspond to the clients 350 of FIG. 3, according to some embodiments. The query may correspond to the query 152 of FIG. 1, according to some embodiments. The client may include a computing device configured to execute application logic for retrieving data from the database. The application logic may include generating the query and subsequently sending the query to the database service, according to some embodiments.

The method 600 may also include identifying a pool of query processing clusters that are capable of processing the query on behalf of the client, at 604. The pool of query processing clusters may correspond to the computing resource pool 120 of FIG. 1 or the account cluster pools 316a . . . n, according to some embodiments. In some embodiments, the pool of query processing clusters may be identified based on determining access permissions for the client. In other embodiments, the pool of query processing clusters may be identified based on allocations for the client as indicated in a service level agreement. In some embodiments, the query processing clusters may include a plurality of computing nodes configured to implement at least a portion of tasks to process the query on behalf of the client. For example, the computing nodes may be coordinated to collaboratively process the query.

The method 600 may further include selecting a first subset of query processing clusters from the pool of query processing clusters, at 606. The first subset of query processing clusters may correspond to the random subset 122 of FIG. 1. In some embodiments, the first subset of query processing clusters may be randomly selected. For example, the query placement system may select two or more query processing clusters at random from the pool of query processing clusters.

The method 600 may also include determining resource utilization for each query processing cluster of the first subset of query processing clusters based on utilization data maintained by the query placement system, at 608. In some embodiments, each query processing cluster of the first subset of query processing clusters may be configured to send the utilization data pertaining to respective query processing clusters. The utilization data may correspond to the utilization metrics 210 or the utilization metrics 230 of FIG. 2, according to some embodiments. The utilization data may include CPU utilization metrics, memory utilization metrics, or software thread utilization metrics, according to some embodiments. In some embodiments, the query placement system may store the utilization data for the query processing clusters as part of metadata for the query processing clusters.

The method 600 may further include sending a request to a selected query processing cluster for assignment of the query based on the selected query processing cluster having a lowest resource utilization of the first subset of query processing clusters, at 610. In some embodiments, the query placement system may compare the utilization data for each query processing cluster of the first subset of query processing clusters. For example, the query placement system may analyze the utilization data to determine which query processing clusters have a lowest CPU utilization, a lowest memory utilization, a lowest software thread utilization threshold, or a lowest combined resource utilization. In other embodiments, the query placement system may select the query processing cluster based on other selection criteria. For example, the other selection criteria may include other metrics such as cluster configurations, a quantity of nodes in the query processing cluster, known capabilities of the query processing cluster (e.g., hardware of the query processing cluster is optimized for a specific processing task), cluster bandwidth, or other cluster utilization metrics.

The method 600 may include receiving a response from the selected query processing cluster indicating whether the selected query processing cluster can accept or has rejected the query for execution, at 612. The method 600 may also include determining whether the selected query processing cluster can accept the query, at 614. In some embodiments, the response to the request may include a notification that indicates acceptance or rejection of the query. Based on a determination that the selected query processing cluster can accept the query, the method 600 may proceed to 616. Based on a determination that the selected query processing cluster has rejected the query for execution, the method 600 may proceed to 622.

Based on a determination that the selected query processing cluster can accept the query, the method 600 may also include assigning the query to the selected query processing cluster and cause the selected query processing cluster to perform the query at the database, at 616. Assigning the query may correspond to assignment 154 or assignment 172 of the query of FIG. 1, according to some embodiments. The query placement system may be configured to send information pertaining to the query to the selected query processing cluster. The query placement system may send an instruction to the selected query processing cluster to initiate performance of the query to retrieve data from the database.

The method 600 may further include receiving the requested data from the database, at 618. In some embodiments, the query processing cluster may complete performance of the query at the database to obtain the requested data. In some embodiments, the query processing cluster may be configured to provide the requested data to a data processing system configured to transmit the requested data to the client.

The method 600 may conclude by sending, to the client, a response to the query including the requested data, at 620. The response to the query may correspond to the query result 154 of FIG. 1, according to some embodiments. The response to the query may provide the requested data to the client as a payload to the response. In some embodiments, the response to the query may include information indicating a storage location for the client to obtain the requested data from another storage location separate from the database.

Based on a determination that the selected query processing cluster has rejected the query for execution, the method 600 may include another query processing cluster from the selected subset of query processing clusters based on an estimated utilization of the query executing at the selected query processing cluster, the estimated utilization indicated in the received response, at 622. In some embodiments, the query placement system may be configured to maintain the selected subset of query processing clusters and attempt to select another query processing cluster. For example, the query placement system may identify the other query processing cluster from the selected subset of query processing clusters to attempt assignment of the query.

The method 600 may include sending a request to the other selected query processing cluster for assignment of the query, at 624. The method 600 may return to 612 to receive a response from the other selected query processing center indicating whether the selected query processing cluster can accept or has rejected the query for execution. The method 600 may continue until the query placement system is able to assign the query to a query processing cluster.

Figure 7:
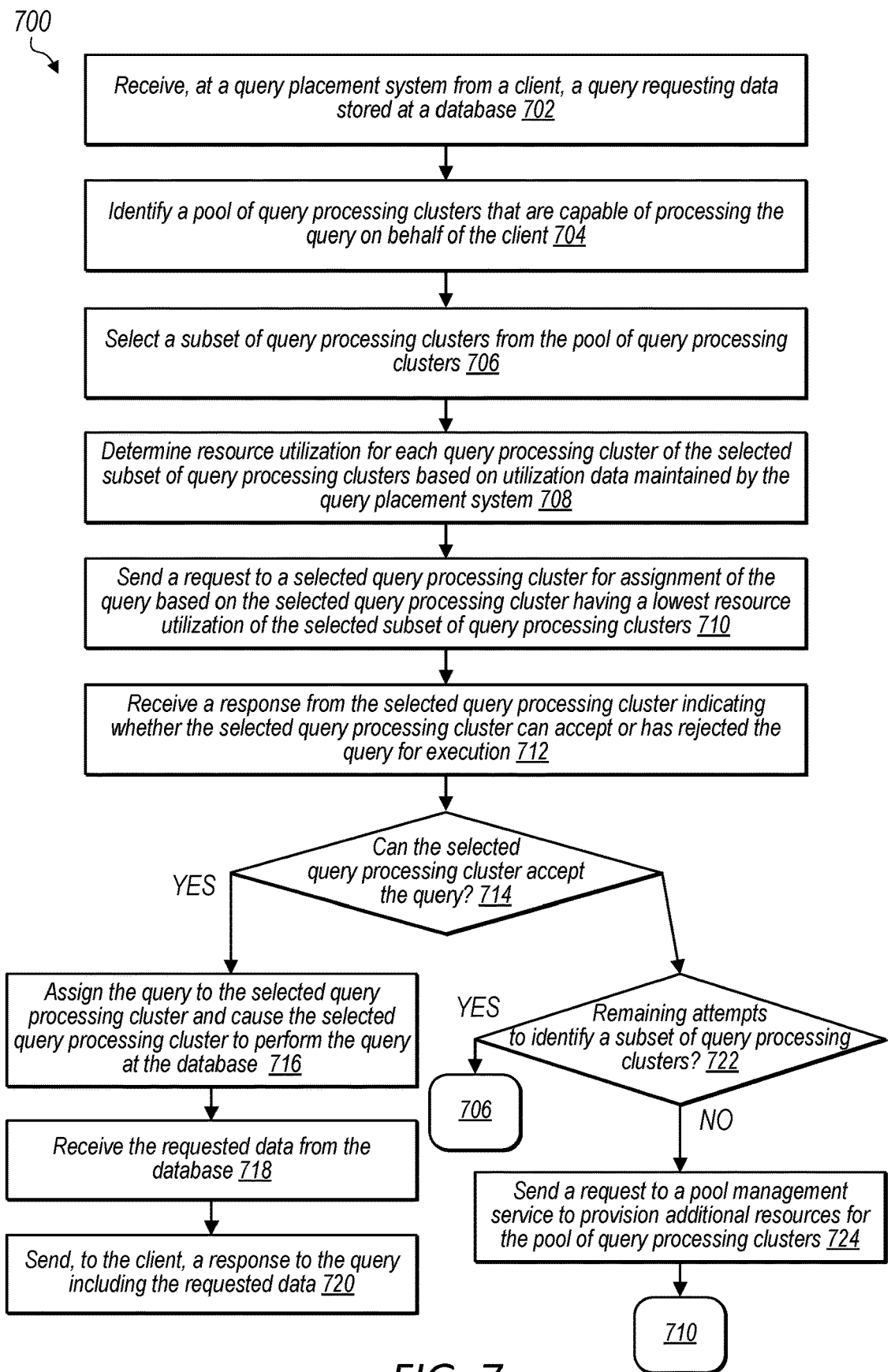
FIG. 7 is a flowchart diagram for a method for assigning a query to a computing resource for retrieving data from a database, according to some embodiments.

FIG. 7 illustrates a flowchart diagram for a method 700 for assigning a query to a computing resource for retrieving data from a database, according to some embodiments. The method 700 may be performed by a query placement system, such as the placement system 130 of FIG. 1, the placement system 250 of FIG. 2, or the placement system 317 of FIG. 3, according to some embodiments. The query placement system may be included as part of a database service, such as the provider network service 111 of FIG. 1 or database service 310 of FIG. 3, according to some embodiments. The database service may be implemented as part of a provider network, such as provider network 300 of FIG. 3, according to some embodiments.

The method 700 may include receiving, at a query placement system from a client, a query requesting data stored at a database, at 702. The client may correspond to the clients 350 of FIG. 3, according to some embodiments. The query may correspond to the query 152 of FIG. 1, according to some embodiments. The client may include a computing device configured to execute application logic for retrieving data from the database. The application logic may include generating the query and subsequently sending the query to the database service, according to some embodiments.

The method 700 may also include identifying a pool of query processing clusters that are capable of processing the query on behalf of the client, at 704. The pool of query processing clusters may correspond to the computing resource pool 120 of FIG. 1 or the account cluster pools 316a . . . n, according to some embodiments. In some embodiments, the pool of query processing clusters may be identified based on determining access permissions for the client. In other embodiments, the pool of query processing clusters may be identified based on allocations for the client as indicated in a service level agreement. In some embodiments, the query processing clusters may include a plurality of computing nodes configured to implement at least a portion of tasks to process the query on behalf of the client. For example, the computing nodes may be coordinated to collaboratively process the query.

The method 700 may further include selecting a subset of query processing clusters from the pool of query processing clusters, at 706. The subset of query processing clusters may correspond to the random subset 122 of FIG. 1. In some embodiments, the subset of query processing clusters may be randomly selected. For example, the query placement system may select two or more query processing clusters at random from the pool of query processing clusters.

The method 700 may also include determining resource utilization for each query processing cluster of the subset of query processing clusters based on utilization data maintained by the query placement system, at 708. In some embodiments, each query processing cluster of the subset of query processing clusters may be configured to send the utilization data pertaining to respective query processing clusters. The utilization data may correspond to the utilization metrics 210 or the utilization metrics 230 of FIG. 2, according to some embodiments. The utilization data may include CPU utilization metrics, memory utilization metrics, or software thread utilization metrics, according to some embodiments. In some embodiments, the query placement system may store the utilization data for the query processing clusters as part of metadata for the query processing clusters.

The method 700 may further include sending a request to a selected query processing cluster for assignment of the query based on the selected query processing cluster having a lowest resource utilization of the subset of query processing clusters, at 710. In some embodiments, the query placement system may compare the utilization data for each query processing cluster of the subset of query processing clusters. For example, the query placement system may analyze the utilization data to determine which query processing clusters have a lowest CPU utilization, a lowest memory utilization, a lowest software thread utilization threshold, or a lowest combined resource utilization. In other embodiments, the query placement system may select the query processing cluster based on other selection criteria. For example, the other selection criteria may include other metrics such as cluster configurations, a quantity of nodes in the query processing cluster, known capabilities of the query processing cluster (e.g., hardware of the query processing cluster is optimized for a specific processing task), cluster bandwidth, or other cluster utilization metrics.

The method 700 may include receiving a response from the selected query processing cluster indicating whether the selected query processing cluster can accept or has rejected the query for execution, at 712. The method 700 may also include determining whether the selected query processing cluster can accept the query, at 714. In some embodiments, the response to the request may include a notification that indicates acceptance or rejection of the query. Based on a determination that the selected query processing cluster can accept the query, the method 700 may proceed to 716. Based on a determination that the selected query processing cluster has rejected the query for execution, the method 700 may proceed to 722.

Based on a determination that the selected query processing cluster can accept the query, the method 700 may also include assigning the query to the selected query processing cluster and cause the selected query processing cluster to perform the query at the database, at 716. Assigning the query may correspond to assignment 154 or assignment 172 of the query of FIG. 1, according to some embodiments. The query placement system may be configured to send information pertaining to the query to the selected query processing cluster. The query placement system may send an instruction to the selected query processing cluster to initiate performance of the query to retrieve data from the database.

The method 700 may further include receiving the requested data from the database, at 718. In some embodiments, the query processing cluster may complete performance of the query at the database to obtain the requested data. In some embodiments, the query processing cluster may be configured to provide the requested data to a data processing system configured to transmit the requested data to the client.

The method 700 may conclude by sending, to the client, a response to the query including the requested data, at 720. The response to the query may correspond to the query result 154 of FIG. 1, according to some embodiments. The response to the query may provide the requested data to the client as a payload to the response. In some embodiments, the response to the query may include information indicating a storage location for the client to obtain the requested data from another storage location separate from the database.

Based on a determination that the selected query processing cluster has rejected the query for execution, the method 700 may include determining whether there are remaining attempts to identify a subset of query processing clusters, at 722. In some embodiments, the query placement system may be configured to track a quantity of attempts of identifying or selecting a subset of query processing clusters from the pool of query processing clusters. For example, the query placement system may be limited to a pre-determined quantity of attempts. Based on a determination that there are remaining attempts to identify a subset of query processing clusters, the method 700 may return to 706 to select another subset of query processing clusters from the pool of query processing clusters.

Based on a determination that there are no remaining attempts to identify a subset of query processing clusters, the method 700 may include sending a request to a pool management service to provision additional resources for the pool of query processing clusters, at 724. In some embodiments, the pool management service may correspond to pool management 313 of FIG. 3. The pool management service may be configured to manage allocations and deployments of query processing clusters for the database service. For example, the pool management service may be configured to deploy additional query processing clusters to fulfill the query in response to the query placement system being unable to assign the query within a certain number of attempts. The method 700 may return to 710 to send a request to a selected query processing cluster from the provisioned additional resources. The method 700 may continue until the query placement system is able to assign the query to a query processing cluster.

FIG. 8 is a flowchart diagram illustrating a method 800 for query management for a data set, according to some embodiments. The method 800 may be performed by a placement system, such as the placement system 130 of FIG. 1, the placement system 250 of FIG. 2, or the placement system 317 of FIG. 3, according to some embodiments.

The method 800 may include receiving a query targeting a data set at a placement system for a provider network service that automatically manages a size of a pool of computing resources to perform queries to the data set, at 802. The query may correspond to the query 152 of FIG. 1, according to some embodiments.

The method 800 may also include receiving a rejection of a first assignment of the query to a first computing resource of a first subset of computing resources randomly selected from the pool of computing resources, where the rejection includes an estimated utilization for the query executing at the first computing resource, at 804. The pool of query processing clusters may correspond to the computing resource pool 120 of FIG. 1 or the account cluster pools 316a . . . n, according to some embodiments. The first subset of computing resources may correspond to the random subset 122 of FIG. 1. The rejection may correspond to the rejection 156 of the query of FIG. 1, according to some embodiments.

The method 800 may further include sending a request to a second computing resource of a second subset of computing resources from the pool of computing resources to retry assignment of the query, where the second computing resource is selected based on the estimated utilization of the query, at 806. The second subset of computing resources may correspond to the random subset 160 of computing resources of FIG. 1, according to some embodiments. In some embodiments, the placement system may be configured to select the second computing resource based on utilization data of the second subset of computing resources and the estimated utilization.

The method 800 may also include based on a determination to modify the size of the pool of computing resources used to perform queries to the data set, sending a request to a pool management service to provision additional resources for the pool of computing resources, at 808. In some embodiments, the determination to modify the size may be performed as part of the scaling-event detection 134 of FIG. 1, according to some embodiments. In some embodiments, the determination to modify the size may be based on the pool of computing resources being unable to accept the query in a certain quantity of attempts to assign the query. In some embodiments, the pool management service may correspond to pool management 313 of FIG. 3. The pool management service may be configured to manage allocations and deployments of query processing clusters for the database service. For example, the pool management service may be configured to deploy additional query processing clusters to fulfill the query in response to the query placement system being unable to assign the query within a certain number of attempts.

Figure 9:
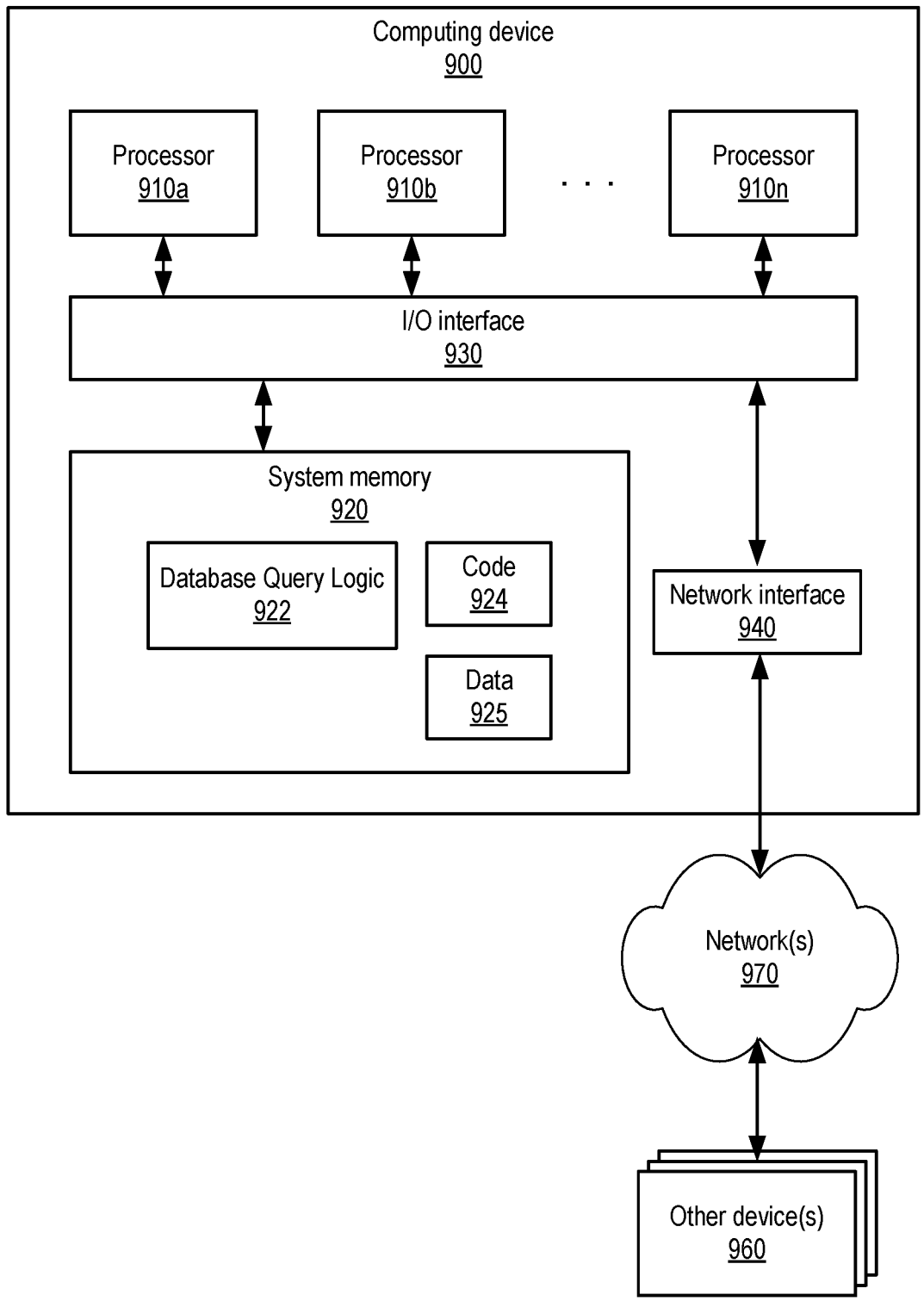
FIG. 9 is a block diagram illustrating an example computer system that may be used in some embodiments.

FIG. 9 illustrates a block diagram of an example computer system that may be used in some embodiments. In the illustrated embodiment, computer system 900 includes one or more processors 910 coupled to a system memory 920 via an input/output (I/O) interface 930. Computer system 900 further includes a network interface 940 coupled to I/O interface 930. In some embodiments, computer system 900 may be illustrative of servers implementing enterprise logic or downloadable application, while in other embodiments servers may include more, fewer, or different elements than computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions on or across the processors 910. For example, in various embodiments, processors 910 may be embedded processors implementing any of a variety of instruction set architectures (ISAs), such as the x86, x86-64, ARM, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor 910. In various embodiments, system memory 920 may be implemented using one or more of any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for the management of securely memory compression are shown stored within system memory 920 as program instructions 924. In some embodiments, system memory 920 may include data 925 which may be configured as described herein. In some embodiments, system memory 920 may include database query logic 922. For example, database query logic 922 may perform the functions of the placement system 130 of FIG. 1, the placement system 250 of FIG. 2, or the placement system 317 of FIG. 3.

In one embodiment, I/O interface 930 may be configured to coordinate I/O traffic between processor 910, system memory 920 and any peripheral devices in the system, including through network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments, some or all of the functionality of I/O interface 930, such as an interface to system memory 920, may be incorporated directly into processor 910.

Network interface 940 may be configured to allow data to be exchanged between computer system 900 and other devices attached to a network, such as between client devices (e.g., 960, etc.) and other computer systems, or among hosts, for example. In particular, network interface 940 may be configured to allow communication between computer system 900 and/or various other devices 960 (e.g., I/O devices). Other devices 960 may include scanning devices, display devices, input devices and/or other communication devices, as described herein. Network interface 940 may commonly support one or more wireless networking protocols (e.g., Wi-Fi/IEEE 802.11, or another wireless networking standard). However, in various embodiments, network interface 940 may support communication via any suitable wired or wireless general data networks 970, such as other types of Ethernet networks, for example. Additionally, network interface 940 may support communication via telecommunications/telephony networks such as analog voice networks or digital fiber communications networks, via storage area networks such as Fibre Channel SANs, or via any other suitable type of network and/or protocol.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 900 via I/O interface 930. A computer-readable storage medium may also include any volatile or non-volatile media such as RAM (e.g. SDRAM, DDR SDRAM, RDRAM, SRAM, etc.), ROM, etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, which may be implemented via network interface 940.

In some embodiments, I/O devices may be relatively simple or "thin" client devices. For example, I/O devices may be configured as dumb terminals with display, data entry and communications capabilities, but otherwise little computational functionality. However, in some embodiments, I/O devices may be computer systems configured similarly to computer system 900, including one or more processors 910 and various other devices (though in some embodiments, a computer system 900 implementing an I/O device 950 may have somewhat different devices, or different classes of devices).

In various embodiments, I/O devices (e.g., scanners or display devices and other communication devices) may include, but are not limited to, one or more of: handheld devices, devices worn by or attached to a person, and devices integrated into or mounted on any mobile or fixed equipment, according to various embodiments. I/O devices may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 900. In general, an I/O device (e.g., cursor control device, keyboard, or display(s) may be any device that can communicate with elements of computing system 900.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on one or more computer-readable storage media coupled to the processor. The program instructions may be configured to implement the functionality described herein (e.g., the functionality of the data transfer tool, various services, databases, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending, or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:
   at least one processor; and
   a memory, storing program instructions that when executed by the at least one processor, cause the at least one processor to implement a query placement system for a managed database service that automatically manages a size of a pool of processing clusters used to perform queries to a data set, the query placement system configured to:
      receive a query from a client of the managed database service;
      identify the pool of processing clusters associated with the client, respectively capable of processing the query;
      randomly select a first subset of two or more processing clusters from the pool of processing clusters;
      send the query to a first selected processing cluster in the first subset of two or more processing clusters, wherein the first selected processing cluster is selected by the query placement system according to utilization data for the pool of processing clusters maintained at the query placement system;
      receive a response from the first selected processing cluster of the first subset of two or more processing clusters indicating that the first selected processing cluster does not accept the query for execution according to an evaluation of local utilization data maintained at the first selected processing cluster, wherein the response includes an estimated utilization of computing resources to execute the query at the first selected processing cluster that was considered in combination with the local utilization data with respect to a utilization threshold, wherein the consideration of the estimated utilization in combination with the local utilization data with respect to the utilization threshold determines that the first selected processing cluster cannot accept the query for execution;
      before making a determination to modify the size of the pool of processing clusters according to the estimated utilization received from the first selected processing cluster:
         select a second subset of two or more processing clusters of the pool of processing clusters that is different from the first subset of two or more processing clusters;
         use the estimated utilization of computing resources to execute the query determined by and received from the first selected processing cluster to select, from the second subset of two or more processing clusters, a second processing cluster based, at least in part, on the utilization data for the pool of processing clusters maintained at the query placement system; and
         send the query to the second processing cluster.

2. The system of claim 1, wherein the query placement system is further configured to:
   determine that an additional attempt remains to retry assignment of the query before the random selection of the second subset of two or more processing clusters from the pool of processing clusters.

3. The system of claim 2, wherein the query placement system is further configured to:
   receive a response from the second processing cluster of the second subset of two or more processing clusters indicating that the second processing cluster does not accept the query for execution according to an evaluation of local utilization data maintained at the second processing cluster;
   determine that no additional attempts remain to retry assigning the query using random subset selection, send the query to a randomly selected processing cluster of the second subset of two or more processing clusters for forced assignment of the query to the randomly selected processing cluster, wherein the forced assignment of the query causes the query to be completed at the randomly selected processing cluster.

4. The system of claim 1, wherein the query placement system is further configured to:
   in response to a rejection of the query from the second processing cluster of the second subset of two or more processing clusters:
      determine a modification to increase the size of the pool of processing clusters;
      cause one or more additional processing clusters to be added to the pool of processing clusters; and
      send the query to one of the one or more additional processing clusters in the pool of processing clusters to be performed.

5. The system of claim 1, wherein the query placement system is further configured to:
   receive, from individual processing clusters of the pool of processing clusters, the utilization data indicating, for the processing cluster:
      central processing unit (CPU) utilization;
      memory utilization; and
      software thread utilization.

6. A method, comprising:
   receiving, from a client, a query targeting a data set at a query placement system for a managed database service that automatically manages a size of a pool of processing clusters used to perform queries to the data set;
   identifying the pool of processing clusters as associated with the client, respectively capable of processing the query;
   randomly selecting a first subset of two or more processing clusters from the pool of processing clusters;
   sending the query to a first selected processing cluster in the first subset of two or more processing clusters, wherein the first selected processing cluster is selected by the query placement system according to utilization data for the pool of processing clusters maintained at the query placement system;
   receiving a response from the first selected processing cluster of the first subset of two or more processing clusters indicating that the first selected processing cluster does not accept the query for execution according to an evaluation of local utilization data maintained at the first selected processing cluster, wherein the response includes an estimated utilization of computing resources to execute the query at the first selected processing cluster that was considered in combination with the local utilization data with respect to a utilization threshold, wherein the consideration of the estimated utilization in combination with the local utilization data with respect to the utilization threshold determines that the first selected processing cluster cannot accept the query for execution;

before making a determination to modify the size of the pool of processing clusters according to the estimated utilization received from the first selected processing cluster:

selecting a second subset of two or more processing clusters of the pool of processing clusters that is different from the first subset of two or more processing clusters;

using the estimated utilization of computing resources to execute the query determined by and received from the first selected processing cluster to select, from the second subset of two or more processing clusters, a second processing cluster based, at least in part, on the utilization data for the pool of processing clusters maintained at the query placement system; and sending the query to the second processing cluster.

7. The method of claim 6, further comprising:
after receiving a rejection of the query from the second processing cluster of the second subset of two or more processing clusters:
selecting, by the query placement system, another processing cluster of the second subset of two or more processing clusters; and
sending, by the query placement system, a request to the other processing cluster of the second subset of two or more processing clusters to retry assigning the query.

8. The method of claim 6, further comprising:
after receiving a rejection of the query from the second processing cluster of the second subset of two or more processing clusters:
determining, by the query placement system, a modification to increase the size of the pool of processing clusters;
causing, by the query placement system, one or more additional processing clusters to be added to the pool of processing clusters; and
sending, by the query placement system, the query to one of the one or more additional processing clusters in the pool of processing clusters to be performed.

9. The method of claim 8, further comprising:
determining that the pool of processing clusters has reached a maximum size; and
sending the query to a randomly selected processing clusters of the second subset of two or more processing clusters for forced assignment of the query at the randomly selected processing cluster, wherein the forced assignment of the query causes the query to be completed at the randomly selected processing cluster.

10. The method of claim 6, further comprising:
determining, by the query placement system, a modification to decrease the size of the pool of processing clusters; and
identifying, by the query placement system, one or more underutilized processing clusters based on the utilization data for the pool of processing clusters; and
causing, by the query placement system, the one or more underutilized processing clusters to be removed from the pool of processing clusters.

11. The method of claim 8, further comprising:
receiving an indication from the second processing cluster that assignment of the query has been accepted, wherein results of the query are provided by the second processing cluster to a client that sent the query.

12. The method of claim 6, further comprising:
selecting, by the query placement system, the first selected processing cluster from the first subset of two or more processing clusters based on the utilization data for the pool of processing clusters, wherein the first selected processing cluster is selected based on a determination that the first selected processing cluster has a lowest utilization of the first subset of two or more processing clusters.

13. The method of claim 12, further comprising:
receiving, at the query placement system from individual processing clusters of the pool of processing clusters, the utilization data indicating, for the processing cluster:
central processing unit (CPU) utilization;
memory utilization; and
software thread utilization.

14. One or more non-transitory, computer-readable storage media storing instructions that, when executed on or across one or more processors, cause the one or more processors to implement a query placement system for a managed database service, wherein the query placement system implements:
receiving, from a client, a query targeting a data set at the placement system, wherein the database management service automatically manages a size of pool of processing clusters used to perform queries to the data set;
identifying the pool of processing clusters as associated with the client, respectively capable of processing the query;
randomly selecting a first subset of two or more processing clusters from the pool of processing clusters;
sending the query to a first selected processing cluster in the first subset of two or more processing clusters, wherein the first selected processing cluster is selected by the query placement system according to utilization data for the pool of processing clusters maintained at the placement system;
receiving a response from the first selected processing cluster of the first subset of two or more processing clusters indicating that the first selected processing cluster does not accept the query for execution according to an evaluation of local utilization data maintained at the first selected processing cluster, wherein the response includes an estimated utilization of computing resources to execute the query at the first selected processing cluster that was considered in combination with the local utilization data with respect to a utilization threshold, wherein the consideration of the estimated utilization in combination with the local utilization data with respect to the utilization threshold determines that the first selected processing cluster cannot accept the query for execution;
before making a determination to modify the size of the pool of processing clusters according to the estimated utilization received from the first selected processing cluster:
selecting a second subset of two or more processing clusters of the pool of processing clusters that is different from the first subset of two or more processing clusters;

using the estimated utilization of computing resources to execute the query determined by and received from the first selected processing cluster to select, from the second subset of two or more processing clusters, a second processing cluster based, at least in part, on the utilization data for the pool of computing resources maintained at the placement system; and sending the query to the second processing cluster.

15. The one or more non-transitory, computer-readable storage media of claim 14, wherein the placement system further implements:

in response to a rejection of the query from the second processing cluster of the second subset of two or more processing clusters:
selecting another processing cluster of the second subset of two or more processing clusters; and
sending a request to the other processing cluster of the second subset of two or more processing clusters to retry assigning the query.

16. The one or more non-transitory, computer-readable storage media of claim 14, wherein the placement system further implements:

in response to a rejection of the query from the second processing cluster of the second subset of two or more processing clusters:
determining a modification to increase the size of the pool of processing clusters;
causing one or more additional processing clusters to be added to the pool of computing resources processing clusters; and
sending the query to one of the one or more additional processing clusters in the pool of processing clusters to be performed.

17. The one or more non-transitory, computer-readable storage media of claim 16, wherein the placement system further implements:

determining that the pool of processing clusters has reached a maximum size; and
sending the query to a randomly selected processing cluster of the second subset of two or more processing clusters for forced assignment of the query at the randomly selected processing cluster, wherein the forced assignment of the query causes the query to be completed at the randomly selected processing cluster.

18. The one or more non-transitory, computer-readable storage media of claim 17, wherein the placement system further implements:

determining a modification to decrease the size of the pool of processing clusters; and
identifying one or more underutilized processing clusters based on the utilization data for the pool of processing cluster; and
causing the one or more underutilized processing clusters to be removed from the pool of processing clusters.

19. The one or more non-transitory, computer-readable storage media of claim 16, wherein the placement system further implements:

receiving an indication from the second processing cluster that assignment of the query has been accepted, wherein results of the query are provided by the second processing cluster to the client that sent the query.

20. The one or more non-transitory, computer-readable storage media of claim 14, wherein the placement system further implements:

selecting the first selected processing cluster from the first subset of two or more processing clusters based on the utilization data for the pool of s processing clusters, wherein the first selected processing cluster is selected based on a determination that the first processing cluster has a lowest utilization of the first subset of two or more processing clusters.

* * * * *